United States Patent
Inoue

(10) Patent No.: US 10,162,958 B2
(45) Date of Patent: Dec. 25, 2018

(54) INFORMATION PROCESSING SYSTEM, INFORMATION PROCESSING METHOD, AND NON-TRANSITORY COMPUTER PROGRAM PRODUCT

(71) Applicant: Hiroyuki Inoue, Kanagawa (JP)

(72) Inventor: Hiroyuki Inoue, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 118 days.

(21) Appl. No.: 15/447,352

(22) Filed: Mar. 2, 2017

(65) Prior Publication Data
US 2017/0270290 A1  Sep. 21, 2017

(30) Foreign Application Priority Data

Mar. 15, 2016 (JP) ................. 2016-051514
Jul. 12, 2016 (JP) ................. 2016-138023

(51) Int. Cl.
G06F 21/00 (2013.01)
G06F 21/44 (2013.01)
G06F 21/45 (2013.01)

(52) U.S. Cl.
CPC .............. *G06F 21/44* (2013.01); *G06F 21/45* (2013.01)

(58) Field of Classification Search
CPC ........... G06F 21/33; G06F 21/44; G06F 21/45
USPC ........................................................ 726/19
See application file for complete search history.

(56) References Cited

U.S. PATENT DOCUMENTS

| | | | | |
|---|---|---|---|---|
| 5,721,722 A * | 2/1998 | Kato | ............... | G05B 19/4183 700/2 |
| 6,298,439 B1 * | 10/2001 | Beglin | ............... | G06F 3/0607 711/111 |
| 8,984,608 B2 | 3/2015 | Sanno et al. | | |
| 2005/0015772 A1 * | 1/2005 | Saare | ............... | H04L 67/02 719/310 |
| 2005/0198529 A1 * | 9/2005 | Kitani | ............... | G11B 20/00188 726/22 |
| 2006/0143686 A1 * | 6/2006 | Maes | ............... | G06F 21/6218 726/1 |
| 2006/0271700 A1 * | 11/2006 | Kawai | ............... | H04L 67/1008 709/233 |
| 2008/0046715 A1 * | 2/2008 | Balazs | ............... | G06F 21/41 713/152 |
| 2011/0113484 A1 * | 5/2011 | Zeuthen | ............... | G06F 21/6281 726/19 |

(Continued)

FOREIGN PATENT DOCUMENTS

JP  2013-134655  7/2013

*Primary Examiner* — Syed A Zaidi
(74) *Attorney, Agent, or Firm* — IPUSA, PLLC

(57) ABSTRACT

An information processing system includes an apparatus that carries out a function; an application program configured to provide a service using the function is installed; and one or more processors configured to receive a request to carry out the function transmitted from the application program, determine a type of an authentication token included in the request, determine, in response to receiving the request, determine a type of the apparatus, whether the authentication token is valid based on the determined type of the authentication token and the determined type of the apparatus, and cause the apparatus to carry out the function corresponding to the request if the authentication token is determined as being valid.

18 Claims, 19 Drawing Sheets

(56) References Cited

U.S. PATENT DOCUMENTS

2014/0223570 A1\* 8/2014 Matsushima ......... G06F 21/105
  726/26
2015/0222773 A1\* 8/2015 Sugiyama .......... H04N 1/00856
  358/1.14
2015/0262544 A1 9/2015 Asakimori et al.

\* cited by examiner

FIG.5

| TOKEN VALUE | VALID PERIOD | TYPE FLAG | ... |
|---|---|---|---|
| ... | ... | ... | ... |

| SERIAL NUMBER | VERSION | ... |
|---|---|---|
| ... | ... | ... |

| TOKEN TYPE \ APPARATUS TYPE | DEVELOPMENT VERSION | PRODUCT VERSION |
|---|---|---|
| DEVELOPMENT TOKEN | VALID | INVALID |
| PRODUCT TOKEN | INVALID | VALID |

| TOKEN VALUE | VALID PERIOD | ... |
|---|---|---|
| ... | ... | ... |

FIG.22

| TOKEN VALUE | VALID PERIOD | TYPE FLAG | USE PERMISSION INFORMATION |
|---|---|---|---|
| ... | ... | ... | ... |

13D

INFORMATION PROCESSING SYSTEM, INFORMATION PROCESSING METHOD, AND NON-TRANSITORY COMPUTER PROGRAM PRODUCT

CROSS-REFERENCE TO APPLICATIONS

The present application claims priority under 35 U.S.C. § 119 to Japanese Patent Application No. 2016-051514, filed Mar. 15, 2016, and Japanese Patent Application No. 2016-138023, filed Jul. 12, 2016. The contents of Japanese Patent Application No. 2016-051514 and Japanese Patent Application No. 2016-138023 are incorporated herein by reference in their entirety.

BACKGROUND

1. Technical Field

The present invention relates to an information processing system, an information processing method, and a non-transitory computer program product.

2. Description of the Related Art

Recently, a Web API (Application Programming Interface) for using various functions of an image forming apparatus is made public, and a third-party vendor or the like develops an application to be installed in the image forming apparatus.

SUMMARY

According to one aspect, an information processing system includes an apparatus configured to carry out a function; an application program configured to provide a service using the function; and one or more processors. The one or more processors are configured to receive a request to carry out the function transmitted from the application program, determine a type of an authentication token included in the request, and, in response to receiving the request, determine a type of the apparatus. The one or more processors are further configured to determine whether the authentication token is valid based on the determined type of the authentication token and the determined type of the apparatus, and cause the apparatus to carry out the function corresponding to the request if the authentication token is determined as being valid.

Other objects, features, and advantages will become more apparent from the following detailed description when read in conjunction with the accompanying drawings.

BRIEF DESCRIPTION OF THE DRAWINGS

FIG. 5 illustrates one example of a token;

FIG. 6 illustrates one example of apparatus information;

FIG. 9 illustrates one example of a determination table;

FIG. 11 illustrates one example of an apparatus token;

FIG. 22 illustrates one example of a token; and

DETAILED DESCRIPTION OF EMBODIMENTS

Below, embodiments of the present invention will be described with reference to the accompanying drawings.

First Embodiment

For a third-party vendor or the like, a vendor who manufactures an image forming apparatus or the like may issue a token for authentication (i.e., a "development token"), for an application under development (i.e., a development application) to use a Web API. Thus, the third-party vendor or the like can develop the application using the Web API of the image forming apparatus for development, by using the "development token".

Then, after the completion of the development of the application, a token for authentication (i.e., a "product token"), for the application (i.e., a product application) to use the Web API of an image forming apparatus as a product, may be issued.

In such a situation, if another application under development can use the issued "product token", the other application which a vendor who manufactures the image forming apparatus or the like does not know may be developed by the third-party vendor or the like.

Therefore, an object of a first embodiment of the present invention is to prevent a token from being used in unauthorized manners.

<System Configuration>

Figure 1:
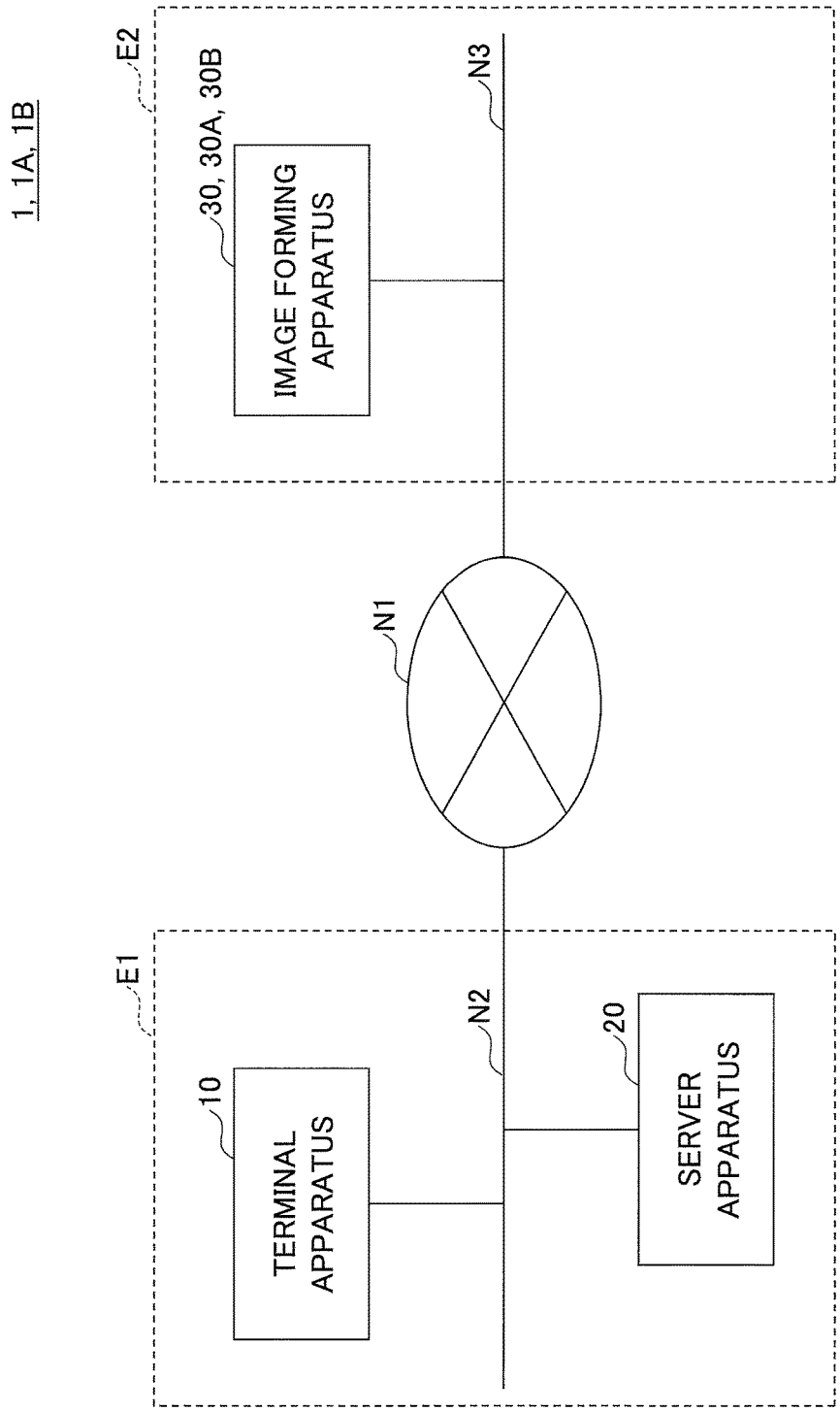
FIG. 1 illustrates a system configuration of one example of an information processing system according to any one of first, second and third embodiments.

First, a system configuration of the information processing system 1 according to the first embodiment will be described with reference to FIG. 1. FIG. 1 illustrates a system configuration of one example of the information processing system 1 according to the first embodiment.

The information processing system 1 illustrated in FIG. 1 includes a system environment E1 in a third-party vendor or the like developing applications that use various functions of the image forming apparatus 30, described above, and a system environment E2 in a vendor who manufactures an image forming apparatus 30 or the like. The system environments E1 and E2 are communicatably connected via a network N1 for a wide area such as the Internet.

In the system environment E1, one or more terminal apparatuses 10 are connected to one or more server apparatuses 20 via a network N2, i.e., for example, a LAN (Local Area Network).

Each terminal apparatus 10 is an information processing apparatus such as a PC (Personal Computer), a smartphone, a tablet, or the like. Developers in the third-party vendor or the like use the terminal apparatus 10 to develop applications that use the various functions of the image forming apparatus 30, and verify operations of the applications under development.

Each server apparatus 20 is an information processing apparatus such as a PC for the third-party vendor or the like to manage the applications under development. The server apparatus 20 responds to requests from the terminal apparatuses 10, and execute applications under development to provide services using various functions of the image forming apparatus 30. Thus, developers or the like can verify operations of the applications under development through the terminal apparatus 10.

In the system environment E2, one or more image forming apparatuses 30 are connected to a network N3 such as a LAN.

Each image forming apparatus 30 is an apparatus such as a MFP (Multiple Function Peripheral) having various functions such as a printing function, a scanning function, a copying function, a facsimile communications function, and so forth. The image forming apparatus 30 receives requests from applications via a Web API, to provide various functions to the applications, respectively.

The system environment E2 may include various apparatuses such as a projector, an electronic blackboard, a digital camera, a game machine, and a car navigation apparatus. Thus, the first embodiment can be applied also to cases where the various apparatuses receive requests from applications via Web APIs in the same way.

Concerning the first embodiment, description will be made assuming that the server apparatus 20 included in the system environment E1 executes an application. However, an embodiment is not limited to this case. That is, the first embodiment can also be applied to a case where, for example, as a result of an application being installed in the terminal apparatus 10, the application is executed in the terminal apparatus 10, in the same way. The first embodiment can also be applied to a case where, for example, an application is executed in an external service such as a cloud service or an ASP (Application Service Provider) in the same way.

<Hardware Configuration>

Figure 2:
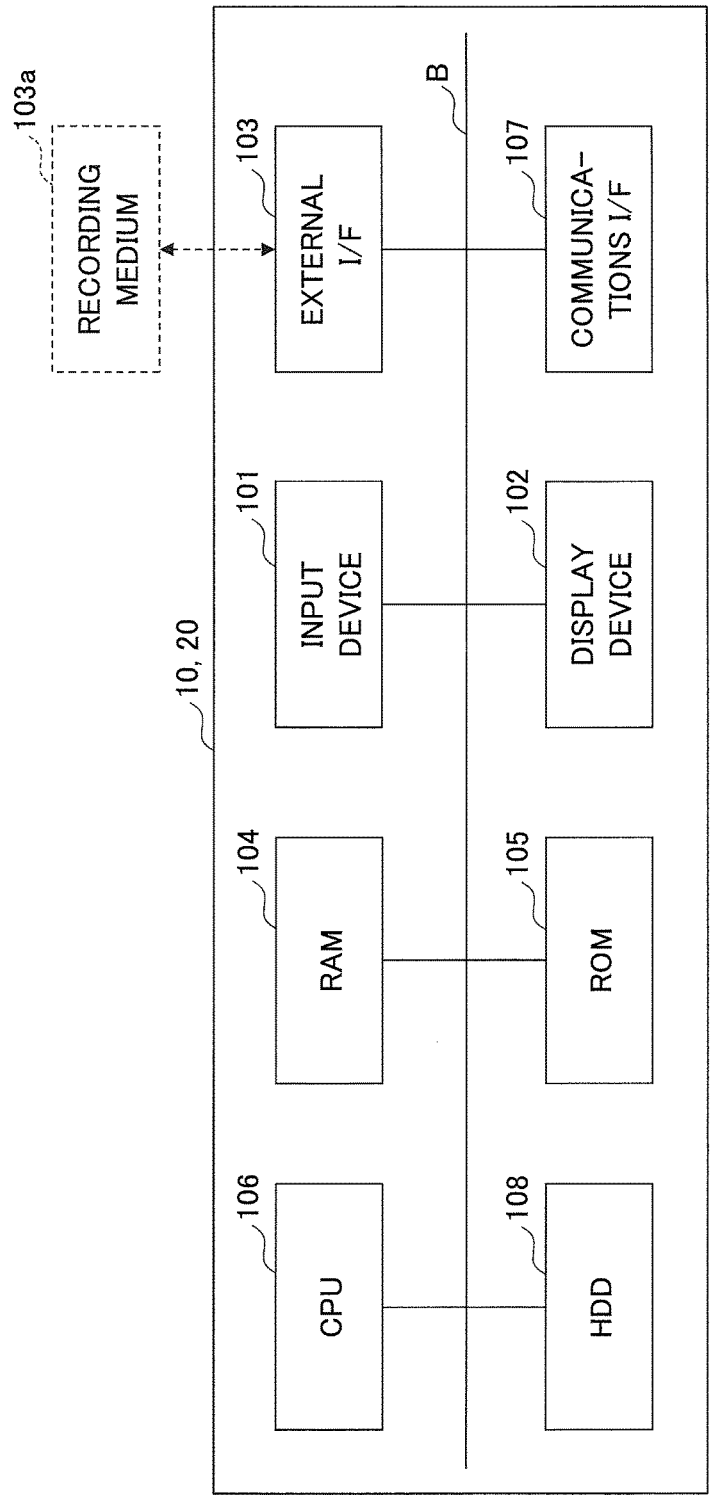
FIG. 2 illustrates hardware configurations of one example of a terminal apparatus and one example of a server apparatus 20 according to any one of the first, second and third embodiments.

Next, hardware configurations of the terminal apparatus 10 and the server apparatus 20 according to the first embodiment will be described with reference to FIG. 2. FIG. 2 illustrates hardware configurations of one example of the terminal apparatus 10 and one example of the server apparatus 20 according to the first embodiment. Because the terminal apparatus 10 and the server apparatus 20 have the same or almost the same hardware configurations, a hardware configuration of the terminal apparatus 10 will now be described as a typical example for the terminal apparatus 10 and the server apparatus 20.

The terminal apparatus 10 illustrated in FIG. 2 includes an input device 101, a display device 102, an external I/F 103, and a RAM (Random Access Memory) 104. The terminal apparatus 10 further includes a ROM (Read-Only Memory) 105, a CPU (Central Processing Unit) 106, a communications I/F 107, and a HDD (Hard Disk Drive) 108. These hardware elements are connected via a bus B.

The input device 101 includes a keyboard, a touch penal, or the like, and is used by a user to input various operation signals. The display device 102 includes a display or the like, and displays processing results of the terminal apparatus 10. Note that the server apparatus 20 may be externally connected with at least one of the input device 101 and the display device 102 via the bus B as appropriate, and may include the other of the input device 101 and the display device 102.

The communications I/F 107 provides an interface for the terminal apparatus 10 to connect to the network N2. Thus, the terminal apparatus 10 carries out communications through the communications I/F 107.

The HDD 108 is a nonvolatile memory storing programs and data. The programs and data stored in the HDD 108 include an OS (Operating System) that is basic software controlling the entirety of the terminal apparatus 10, programs providing various functions, and so forth.

The terminal apparatus 10 may use a drive (for example, a SSD (solid state drive) using a flash memory as a storage medium instead of the HDD 108. The HDD 108 manages the stored programs and data using a file system or a DB (database).

The external I/F 103 provides an interface for external apparatuses. The external apparatuses include a recording medium 103a. The terminal apparatus 10 reads information from the recording medium 103a and writes information to the recording medium 103a through the external I/F 103. The recording mediums 103a include, for example, an IC (Integrated Circuit) card a flexible disk, a CD (Compact disc), a DVD (Digital Versatile Disc), a SD (Secure Digital) card, a USB (Universal Serial Bus) memory, and so forth.

The ROM 105 is a nonvolatile semiconductor memory (storage device) capable of holding programs and data even after the power supply is turned off. The ROM 105 stores programs and data such as a BIOS (Basic Input/Output System) executed when the terminal apparatus 10 is booted, OS settings, and network settings. The RAM 104 is a volatile memory (storage device) temporarily storing programs and data.

The CPU 106 reads programs and data from a storage device such as the ROM 105 or the HDD 108 to the RAM 104 to carry out processes, and thus controls the entirety of the terminal apparatus 10 and implement functions of the terminal apparatus 10.

The terminal apparatus 10 and the server apparatus 20 implement various processes, described later, using the hardware configurations illustrated in FIG. 2.

Figure 3:
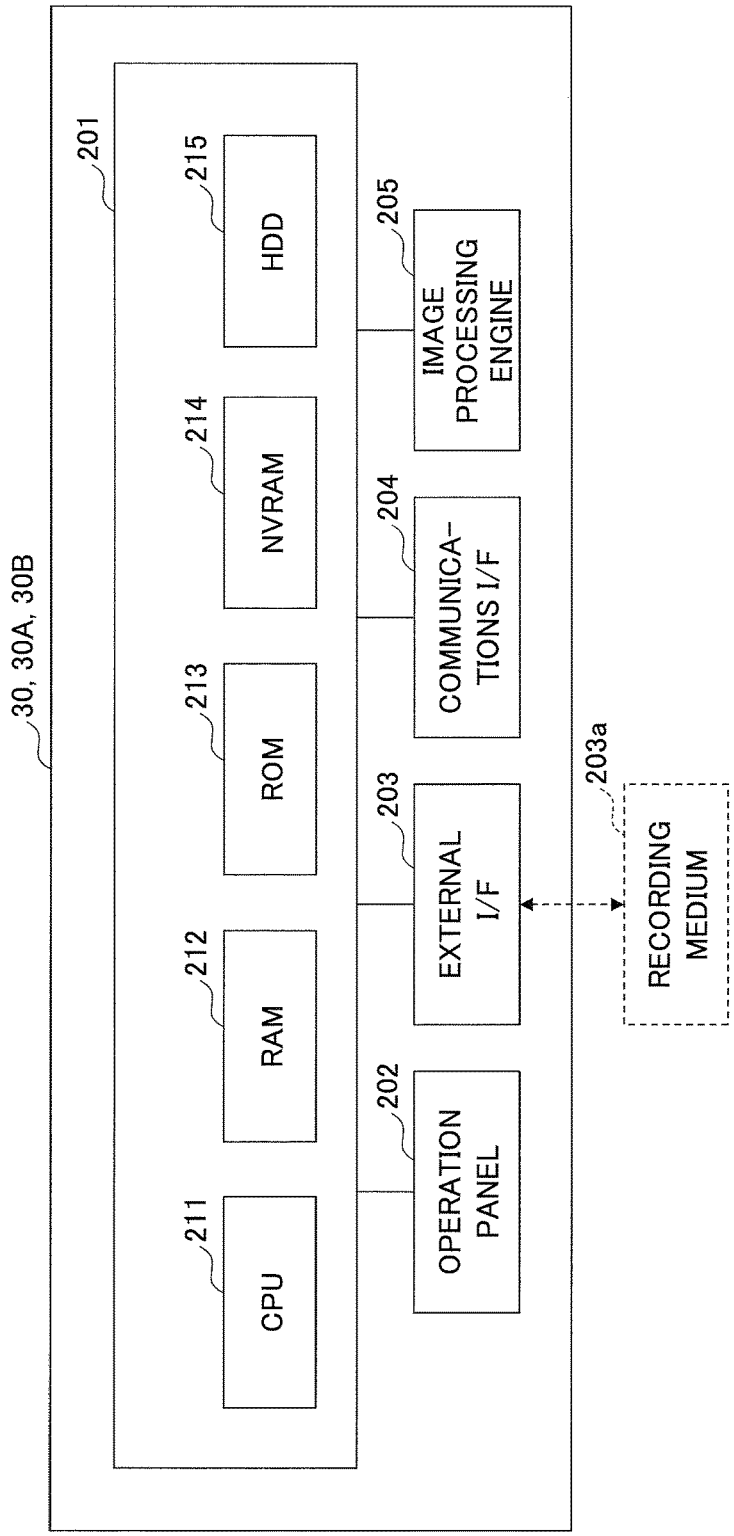
FIG. 3 illustrates a hardware configuration of one example of an image forming apparatus according to any one of the first, second and third embodiments.

Next, a hardware configuration of the image forming apparatus 30 will be described with reference to FIG. 3. FIG. 3 illustrates a hardware configuration of one example of the image forming apparatus 30 according to the first embodiment.

The image forming apparatus 30 illustrated in FIG. 3 includes a controller 201, an operation panel 202, an external I/F 203, a communications I/F 204, and an image processing engine 205. The controller 201 includes a CPU 211, a RAM 212, a ROM 213, a NVRAM (Nonvolatile RAM) 214, and a HDD 215.

The ROM 213 is a nonvolatile semiconductor memory (storage device) stores programs and data. The RAM 104 is a volatile memory (storage device) temporarily storing programs and data. The NVRAM 214 is a semiconductor memory (storage device) storing setting information and so forth. The HDD 215 is a nonvolatile memory (storage device) storing programs and data.

The CPU 211 reads programs and data from a storage device such as the ROM 213, the NVRAM 214, or the HDD 215 to the RAM 212 to carry out processes, and thus controls the entirety of the image forming apparatus 30 and implements functions of the image forming apparatus 30.

The operation panel 202 includes an input unit receiving inputs from the user of the image forming apparatus 30 and a display unit displaying images. The external I/F 203 provides an interface for external apparatuses. The external apparatuses include a recording medium 203a. The image processing apparatus 30 reads information from the recording medium 203a and writes information to the recording medium 203a through the external I/F 203. The recording mediums 103a include, for example, an IC card, a flexible disk, a CD, a DVD, a SD card, a USB memory, and so forth.

The communications I/F 204 provides an interface for the image forming apparatus 30 to connect to the network N3. Thereby, the image forming apparatus 30 carries out communications through the communications I/F 204.

The image processing engine 205 carries out image processing for implementing various functions such as the printing function, the scanning function, the copying function, and the facsimile communications function.

The image processing engine 205 includes, for example, a scanner optically reading an original image to generate image data, a plotter printing images on sheet materials such as paper sheets, a facsimile communications device carrying out facsimile communications, and so forth. The image processing engine 205 may further include, for example, a finisher sorting printed sheets, an ADF (Automatic Draft Feeder) automatically feeding original image sheets, and so forth.

The image forming apparatus 30 according to the first embodiment implements various processes described later using the hardware configuration illustrated in FIG. 3.

<Functional Configuration>

Figure 4:
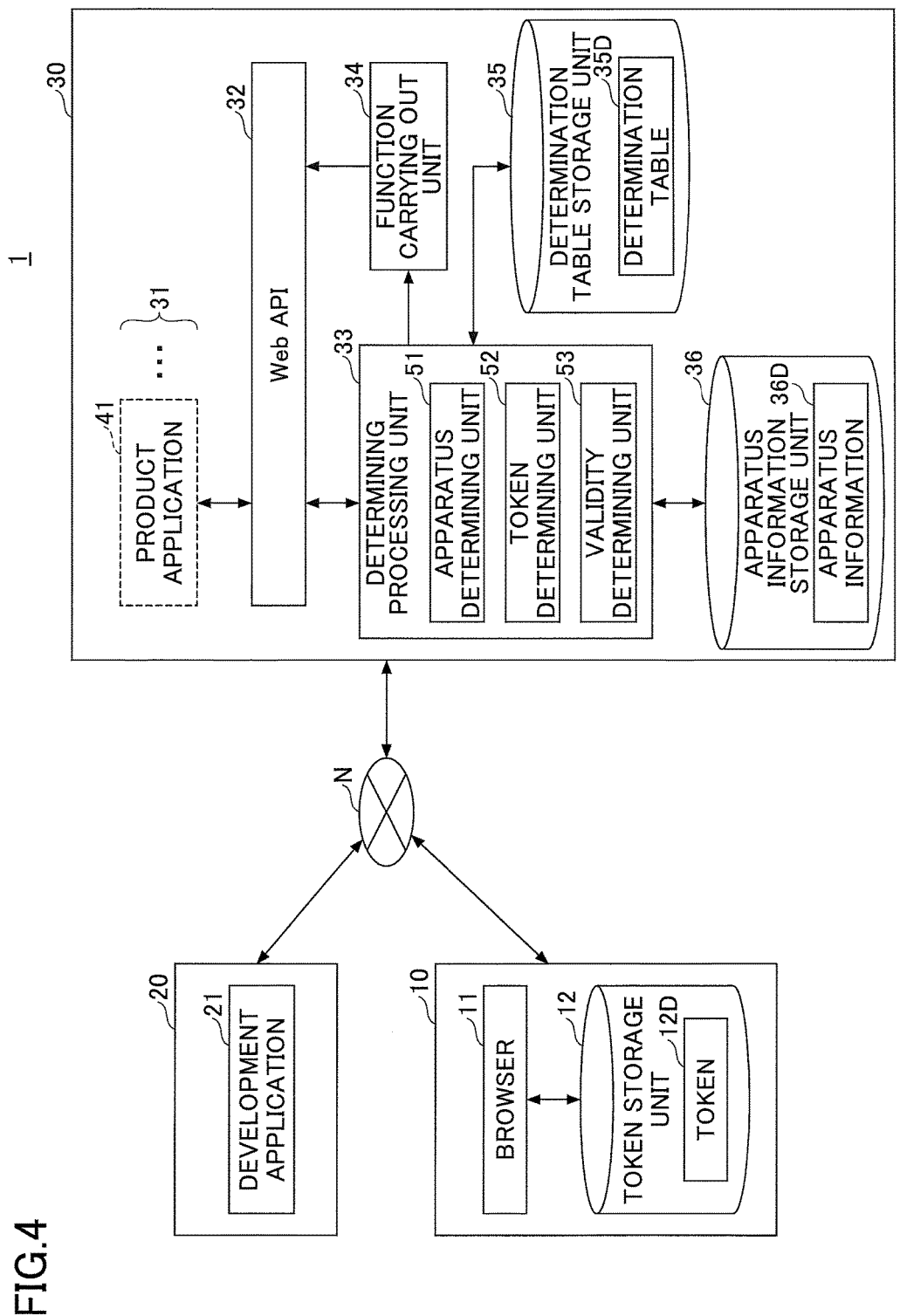
FIG. 4 illustrates a functional configuration of the information processing system according to the first embodiment.

Next, a functional configuration of the information processing system 1 according to the first embodiment will be described with reference to FIG. 4. FIG. 4 illustrates a functional configuration of the information processing system 1 according to the first embodiment.

As illustrated in FIG. 4, the terminal apparatus 10 according to the first embodiment includes a browser 11 implemented by, for example, the CPU 106 and so forth. Through the browser 11, the user of the terminal apparatus 10 can cause a development application 21 described later to be executed (that is, for example, to verify operations of the development application 21).

Also, the terminal apparatus 10 includes a token storage unit 12. The token storage unit 12 can be implemented by, for example, the HDD 108. The token storage unit 12 stores a "development token 12D" or a "product token 12D" issued by a vendor who manufactures the image forming apparatus 30 or the like. The user of the terminal apparatus 10 can receive a service provided by an application using one of the various functions of the image forming apparatus 30, by transmitting a request that includes the token 12D through the browser 11 to the application.

The token 12D stored in the token storage unit 12 will now be described with reference to FIG. 5. FIG. 5 illustrates one example of the token.

As illustrated in FIG. 5, the token 12D includes a token value, a valid period, and a type flag. As the token value, a value that indicates a character string or the like to be used for authentication is set. As the valid period, a value that indicates a period of time during which the token value can be used for authentication is set. As the type flag, a value that indicates whether the type of the token 12D is a "development token" or a "product token" is set.

Note that a "development token" is a token for authentication to be used by an application under development (that is, the development application 21) to use various functions of the image forming apparatus 30. On the other hand, a "product token" is a token for authentication used by an application for which development has been completed (that is, for example, a product application 41 that has been released as a product) to use various functions of the image forming apparatus 30.

The server apparatus 20 illustrated in FIG. 4 includes the development application 21 executed by, for example, the CPU 106. The development application 21 is an application program that provides a service by using one of the various functions of the image forming apparatus 30A, and is under development by a third-party vendor or the like.

As illustrated in FIG. 4, the image forming apparatus 30 includes an application group 31 that provide services by using various functions of the image forming apparatus 30. After the development of the development application 21 is completed, the development application 21 is downloaded as the product application 41 from, for example, the server apparatus 20 to the image forming apparatus 30, and is installed in the image forming apparatus 30. The application group 31 includes various applications such as a copying application that provides a copying service using the copying function of the image forming apparatus 30, a printing application that provides a printing service using the printing function of the image forming apparatus 30, and so forth. However, an embodiment is not limited to the case where the application group 31 includes a plurality of the applications. That is, the application group 31 includes one or more applications.

The image forming apparatus 30 further includes a Web API 32, a determining processing unit 33, and a function carrying out unit 34. These functional units are implemented as a result of one or more programs installed in the image forming apparatus 30 being executed by the CPU 211.

The image forming apparatus 30 further includes a determination table storage unit 35, and an apparatus information storage unit 36. These storage units can be implemented by using, for example, the HDD 215. It is also possible that at least one of the determination table storage unit 35 and the apparatus information storage unit 36 is implemented by a storage device or the like that is externally connected to the image forming apparatus 30 via a network.

The Web API 32 is an API for the development application 21 and the respective applications included in the application group 31 to use the various functions of the image forming apparatus 30. The development application 21 and so forth send various requests in a form of HTTP (Hypertext Transfer Protocol) requests to the Web API 32, to use the various functions of the image forming apparatus 30 (for example, the scanning function, the facsimile communications function, and so forth).

That is, for example, the development application 21 uses a token 12D included in a HTTP request received from the browser 11, and transmits a HTTP request to the Web API 32. Then, if a determining processing unit 33 described later has determines that the token 12D is valid, the development application 21 can use one of the various functions of the image forming apparatus 30.

The determining processing unit 33 determines whether a token 12D included in a request received from the development application 21 or the like through the Web API 32 is usable. The determining processing unit 33 includes an apparatus determining unit 51, a token determining unit 52, and a validity determining unit 53.

The apparatus determining unit 51 acquires apparatus information 36D from the apparatus information storage unit 36, and determines the type of the image forming apparatus 30 from the apparatus information 36D. The types of the image forming apparatus 30 include "development version" indicating an apparatus used for verifying operations of the development application 21 or the like (that is, for example, an apparatus for testing) and "product version" indicating an apparatus to be sold, leased, or the like, as a product.

The token determining unit 52 determines the type of a token 12D. The types of a token 12D include, as described above, a "development token" indicating a token used by the development application 21 and a "product token" indicating a token used by the product application 41.

The validity determining unit 53 acquires a determination table 35D from the determination table storage unit 35. Then, the validity determining unit 53 determines validity of a token 12D, based on the acquired determination table 35D, the type of the image forming apparatus 30 determined by the apparatus determining unit 51, and the type of the token 12D determined by the token determining unit 52.

For example, if the development application 21 requests to use one of the various functions of the image forming apparatus 30 of "development version" using a "product token 12D", the validity determining unit 53 determines that the token 12D is invalid. For example, if the development application 21 requests to use one of the various functions of the image forming apparatus 30 of "product version" using a "development token 12D", the validity determining unit 53 determines that the token 12D is invalid.

Thus, as a result of the validity determining unit 53 determining validity of a token 12D, it is possible to avoid such a situation that, for example, various functions of the image forming apparatus 30 of "development version" is used by using the "product token 12D". In the same way, it is possible to avoid such a situation that, for example, various functions of the image forming apparatus 30 of "product version" is used by using the "development token 12D".

The function carrying out unit 34 carries out various functions of the image forming apparatus 30 according to determination results of the validity determining unit 53.

The determination table storage unit 35 stores the determination table 35D. The determination table 35D is used to determine, based on the type of the image forming apparatus 30 and the type of a token 12D, whether the token 12D is valid. The determination table 35D will be described later.

The apparatus information storage unit 36 stores the apparatus information 36D that includes various sorts of information concerning the image forming apparatus 30.

The apparatus information 36D stored in the apparatus information storage unit 36 will now be described with reference to FIG. 6. FIG. 6 illustrates one example of the apparatus information 36D.

As illustrated in FIG. 6, the apparatus information 36D includes a serial number, a version, and so forth. As the serial number, a value indicating identification information (for example, the unique production number, or the like) that uniquely identities the image forming apparatus 30 is set. As the version, a value indicating the version number of the image forming apparatus 30 is set. In addition, the apparatus information 36D may further include other various sorts of information such as information that indicates the performance of the image forming apparatus 30.

<Process Detail>

Figure 7:
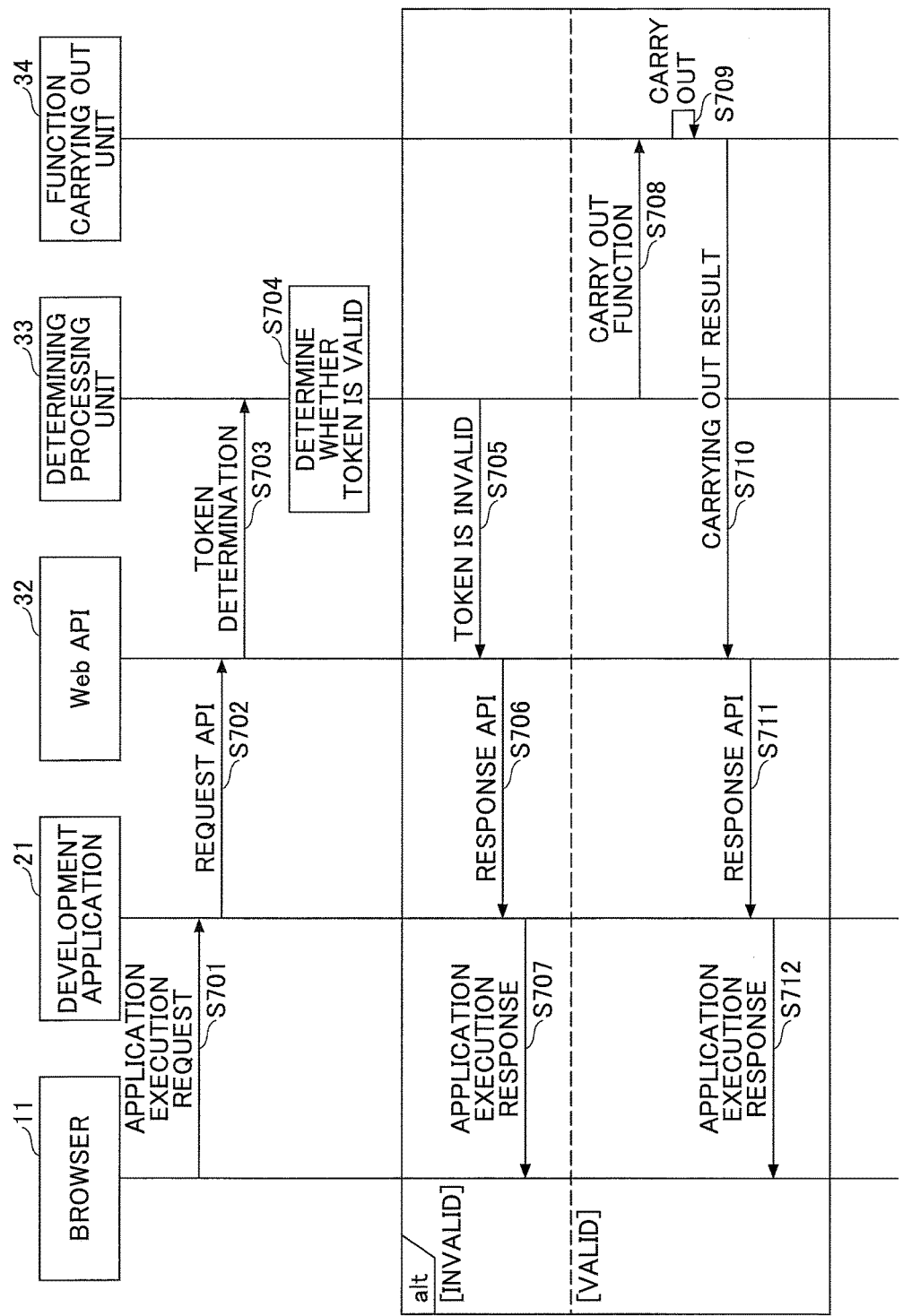
FIG. 7 is a sequence diagram illustrating one example of a process carried out by a development application.

Next, a process of the information processing system 1 according to the first embodiment will be described in detail. Below, a case where the user of the terminal apparatus 10 causes the development application 21 to be executed, and thus, the user verifies operations of the development application 21 providing services using various functions of the image forming apparatus 30 will be described with reference to FIG. 7. FIG. 7 is a sequence diagram illustrating one example of process executed by the development application 21.

First, the user operates the browser 11 of the terminal apparatus 10 to execute the development application 21. As a result, the browser 11 of the terminal apparatus 10 transmits a request to the development application 21 of the server apparatus 20 to execute the application 21 (step S701). Note that the request includes a token 12D. Note that the browser 11 transmits the request in a form of a HTTP request.

In response to receiving the request, the development application 21 in the server apparatus 20 transmits a request API to the Web API 32 of the image forming apparatus 30 (step S702). Note that the request API is a request for using a function of the image forming apparatus 30, and includes the token 12D. Note that the development application 21 transmits the request API in a form of a HTTP request.

In response to receiving the request API, the Web API 32 of the image forming apparatus 30 transmits a request to the determining processing unit 33 to determine whether the token 12D included in the request API is valid (step S703).

In response to receiving the request, the determining processing unit 33 of the image forming apparatus 30 determines whether the token 12D is valid (step S704). That is, the determining processing unit 33 determines whether the token 12D included in the request API is valid. Note that the process of determining whether a token is valid will be described later in detail.

If it is determined in step S704 that the token 12D is invalid, a process of steps S705-S707 is carried out. That is, first, the determining processing unit 33 of the image forming apparatus 30 transmits the determination result that the token 12D included in the request API is invalid to the Web API 32 (step S705).

In response to receiving the determination result that the token 12D is invalid, the Web API 32 of the image forming apparatus 30 transmits a response API indicating that the token 12D is invalid to the development application 21 (step S706).

Finally, in response to receiving the response API indicating that the token 12D is invalid, the development application 21 in the server apparatus 20 transmits a response to the application execution request indicating that the token 12D is invalid to the browser 11 (step S707). Thereby, on the display device 102 of the terminal apparatus 10, the browser 11 displays that, for example, "it is not possible to access the image forming apparatus 30".

On the other hand, if it is determined in step S704 that the token 12D is valid, a process of steps S708-S712 is carried out. That is, first, the determining processing unit 33 of the image forming apparatus 30 transmits a request to the function carrying out unit 34 to carry out the function corresponding to the request API (step S708).

In response to receiving the request, the function carrying out unit 34 of the image forming apparatus 30 carries out the corresponding function (step S709). That is, the function carrying out unit 34 carries out, for example, the corresponding one from among the various functions, i.e., the scanning function, the copying function, the facsimile communications function, or the like, of the image forming apparatus 30, in response to the request.

Next, the function carrying out unit 34 of the image forming apparatus 30 transmits a result of carrying out the function in step S709 to the Web API 32 (step S710). Note that the result includes, for example, image data generated as a result of an original document being read thorough the scanning function if the scanning function is carried out in step S709.

Next, the Web API 32 of the image forming apparatus 30 transmits a response API that includes the function carrying out result to the development application 21 (step S711).

Finally, in response to receiving the response API including the function carrying out result, the development application 21 of the server apparatus 20 carries out, for example, a process based on the received function carrying out result, and transmits a response to the application execution request including the result of the thus carried out process, to the browser 11 (step S712). Note that the process carried out in step S712 is a process unique to the development application 21, and is a process of modifying the image data generated through the scanning function, for example.

Thereby, the display device 102 of the terminal apparatus 10 displays, by the browser 11, the result of the process carried out by the development application 21, for example. Thus, to the user of the terminal apparatus 10, the service using the function of the image forming apparatus 30 is provided by the development application 21.

Note that, with reference to FIG. 7, the case where the development application 21 uses the function of the image forming apparatus 30 has been described. However, the first embodiment is not limited to this case. For example, the process of FIG. 7 may also be applied to a case where the product application 41 uses the corresponding one of the various functions of the image forming apparatus 30 in the same way. That is, for example, the process of FIG. 7 may also be applied to a case where the product application 41 installed in the image forming apparatus 30 or the terminal apparatus 10 transmits a request API in the same way.

Figure 8:
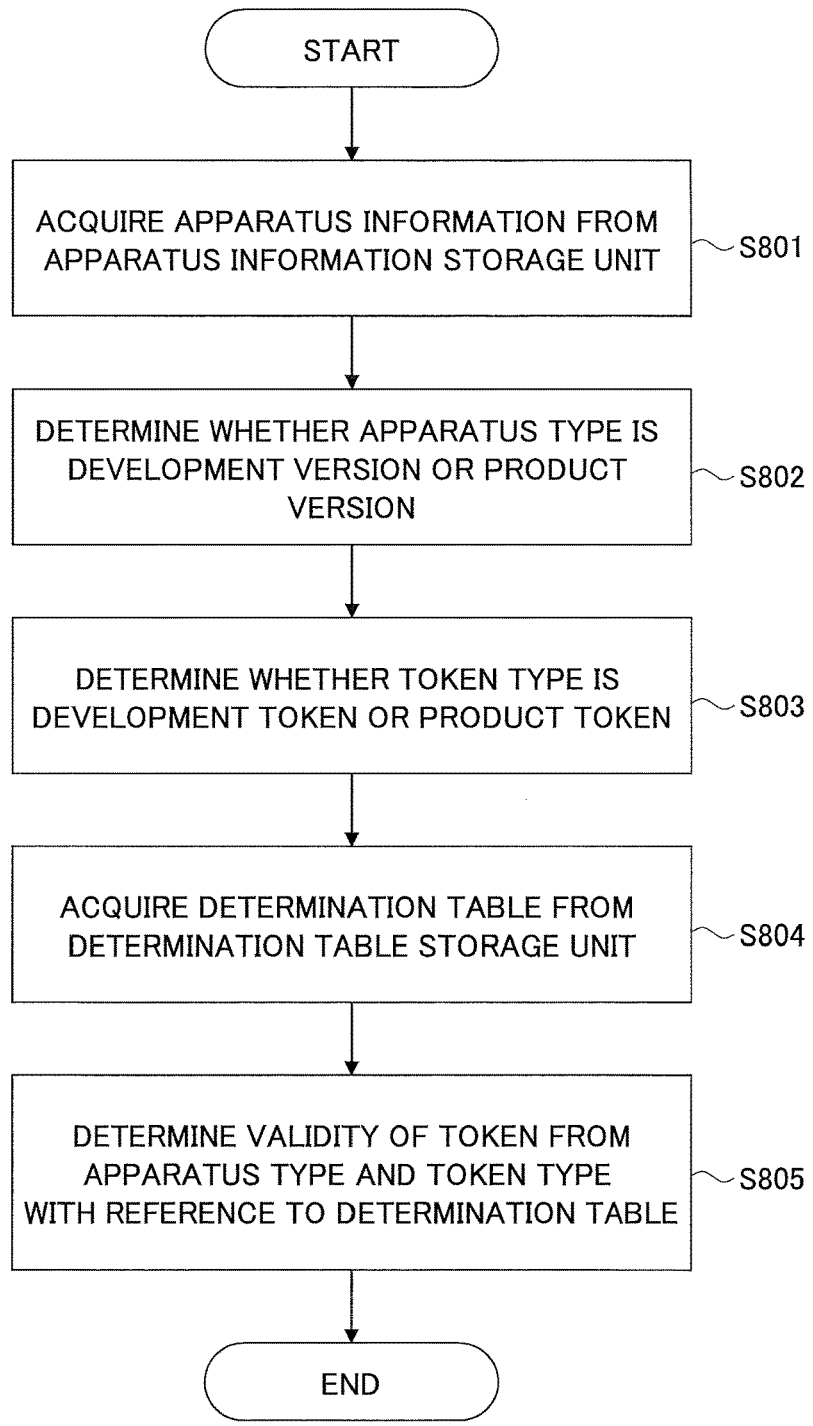
FIG. 8 is a flowchart illustrating one example of a token validity determining process.

Below, the process of determining in step S704 as to whether the token is valid will be described with reference to FIG. 8. FIG. 8 is a flowchart illustrating one example of the token validity determining process. Below, description will be made assuming that the token value and the valid period value included in the token 12D are valid (authorized). Note that if at least one of the token value and the valid period value included in the token 12D is invalid (unauthorized), the determining processing unit 33 can determine that the token 12D is invalid.

First, the apparatus determining unit 51 of the determining processing unit 33 acquires the apparatus information 36D from the apparatus information storage unit 36 (step S801).

Next, the apparatus determining unit 51 of the determining processing unit 33 determines the type of the image forming apparatus 30 from the apparatus information 36D acquired in step S801 (step S802).

Note that the apparatus determining unit 51 determines, based on the serial number or the version included in the apparatus information 36D, the type of the image forming apparatus 30 (that is, the apparatus determining unit 51 determines whether the image forming apparatus 30 is an apparatus of "development version" or "product version").

That is, the apparatus determining unit 51 determines that the image forming apparatus 30 is an apparatus of "development version" if, for example, no value or a null value is set as the serial number of the apparatus information 36D. On the other hand, the apparatus determining unit 51 determines that the image forming apparatus 30 is an apparatus of "product version" if, for example, any value other than the null value is set as the serial number of the apparatus information 36D.

Alternatively, the apparatus determining unit 51 may determine whether the image forming apparatus 30 is an apparatus of "development version" or "product version", according to, for example, the value that is set as the serial number of the apparatus information 36D. Actually, the apparatus determining unit 51 may determine that the image forming apparatus 30 is an apparatus of "development version" if a certain character (for example, "Z") is designated at the first place in the serial number of the apparatus information 36D. On the other hand, the apparatus determining unit 51 may determine that the image forming apparatus 30 is an apparatus of "product version" if any value other than the certain character is designated at the first place in the serial number of the apparatus information 36D.

Alternatively, the apparatus determining unit 51 may determine whether the image forming apparatus 30 is an apparatus of "development version" or "product version", according to, for example, the value that is set as the version of the apparatus information 36D. Actually, the apparatus determining unit 51 may determine that the image forming apparatus 30 is an apparatus of "development version" if the value set as the version of the apparatus information 36D is less than 1 (that is, for example, "0.12"). On the other hand, the apparatus determining unit 51 may determine that the image forming apparatus 30 is an apparatus of "product version" if the value set as the version of the apparatus information 36D is greater than or equal to 1 (that is, for example, "1.00").

Thus, the apparatus determining unit 51 determines, based on various sorts of information such as the serial number or the version included in the apparatus information 36D, the type of the image forming apparatus 30.

Next, the token determining unit 52 of the determining processing unit 33 determines the type of the token 12D included in the request API received by the Web API 32 (step S803). That is, the token determining unit 52 determines the token 12D as a product token if, for example, the value that is set as the type flag of the token 12D is "1". On the other hand, the token determining unit 52 determines the token 12D as a "development token" if, in the example, the value that is set as the type flag of the token 12D is "0".

Alternatively, it is also possible that the token determining unit 52 determines the type of the token 12D according to, for example, whether certain information included in product tokens 12D and not included in development tokens 12D is actually included in a given token 12D.

Thus, the token determining unit 52 determines, based on various sorts of information such as the type flag included in the token 12D, the type of the token 12D.

Next, the validity determining unit 53 of the determining processing unit 33 acquires the determination table 35D from the determination table storage unit 35 (step S804).

The determination table 35D stored in the determination table storage unit 35 will now be described in detail with reference to FIG. 9. FIG. 9 illustrates one example of the determination table 35D.

As illustrated in FIG. 9, in the determination table 35D, information items (values) that indicate whether the token 12D is valid or invalid are associated with respective combinations of the type of an image forming apparatus 30 and the type of a token 12D.

For example, according to the determination table 35D illustrated in FIG. 9, if the type of the image forming apparatus 30 is "development version" and the type of the "token 12D is a "development token", the token 12D is determined as being "valid". On the other hand, for example, according to the determination table 35D illustrated in FIG. 9, if the type of image forming apparatus 30 is "product version" and the type of the token 12D is a "development token", the token 12D is determined as being "invalid".

Next, the validity determining unit 53 of the determining processing unit 33 determines whether the token 12D is valid according to the combination of the type of the image forming apparatus 30 and the type of the token 12D with reference to the determination table 35D acquired in step S804 (step S805).

That is, the validity determining unit 53 reads the value (i.e., "valid" or "invalid") corresponding to the combination of the type of the image forming apparatus 30 determined in step S802 and the type of the token 12D determined in step S803 from the determination table 35D. Then, the validity determining unit 53 acquires the value ("valid" or "invalid") as the determination result. Thus, it is determined whether the token 12D included in the request API is valid (either "valid" or "invalid").

Thus, in the information processing system 1 according to the first embodiment, validity of a token 12D is determined according to the combination of the type of an image forming apparatus 30 and the type of a token 12D.

Therefore, in the information processing system 1 according to the first embodiment, for example, it is possible to avoid such a situation that the development application 21 uses a "product token 12D" to use various functions of an image forming apparatus 30 of "development version". In the same way, in the information processing system 1 according to the first embodiment, for example, it is possible to avoid such a situation that the development application 21 uses a "development token 12D" to use various functions of an image forming apparatus 30 of "product version".

Also, in the information processing system 1 according to the first embodiment, for example, it is possible to avoid such a situation that the product application 41 uses a "development token 12D" to use various functions of an image forming apparatus 30 of "product version". In the same way, in the information processing system 1 according to the first embodiment, for example, it is possible to avoid such a situation that that the product application 41 uses a "product token 12D" to use various functions of an image forming apparatus 30 of "development version".

Thus, according to the information processing system 1 according to the first embodiment, it is possible to avoid such a situation that a "product token 12D" or a "development token 12D" is used in unauthorized manners.

According to the first embodiment described above, it is possible to avoid a product token 12D" or a "development token 12D" from being used in unauthorized manners.

Note that, as mentioned above, the application program 21 or 41 may be installed in the terminal apparatus 10 or an external apparatus such as a cloud service apparatus or an ASP apparatus connected with the terminal apparatus 10 via a network. In such a case, an information processing system (1) includes an apparatus (30) that carries out a function; an application program (21 or 41) installed in a terminal (10) or another apparatus connected to the terminal via a network and configured to provide a service using the function; and one or more processors. The one or more processors are configured to receive a request, transmitted from the application program, to carry out the function; determine a type of an authentication token included in the request, in response to receiving the request; determine a type of the apparatus; determine whether the authentication token is valid based on the determined type of the authentication token and the determined type of the apparatus; and cause the apparatus to carry out the function corresponding to the request if the authentication token is determined as being valid. In the case where an application program (21 or 41) is installed in another apparatus connected to a terminal (10) via a network, the terminal accesses the other apparatus via the network, and the application program provides a service using a function of an apparatus (30), in the same way as described above with reference to FIG. 7, for example.

Second Embodiment

A second embodiment of the present invention will now be described.

It is desired to avoid a Web API of an image forming apparatus used for development from being used by an application under development with a product token, for example. This is because it is desired to avoid such a situation that an application which a vendor who manufactures an image forming apparatus or the like does not know from being developed by a third-party vendor or the like.

However, there is also a case where, a Web API of an image forming apparatus as a product is used in a test of an application with a development token, during development of the application.

The second embodiment has been devised in consideration of such a situation, and an object is to avoid a token from being used in unauthorized manners, while allowing an exceptional use of a token even in an unauthorized manner if appropriate.

Concerning the second embodiment, to the elements that have the same functional configurations as the elements of the first embodiment and the elements that carry out substantially the same processes as the processes of the elements of the first embodiment, the same reference numerals as the reference numerals in the first embodiment are given, and the description of these elements will be omitted.

<System Configuration>

First, a system configuration of an information processing system 1A according to the second embodiment will be described with reference to FIG. 1 described above concerning the first embodiment. FIG. 1 illustrates a system configuration of one example of also the information processing system 1A according to the second embodiment.

The information processing system 1A includes a system environment E1 in a third-party vendor or the like developing applications that use various functions of an image forming apparatus 30A, and a system environment E2 in a vendor who manufactures the image forming apparatus 30A or the like.

Developers or the like use the terminal apparatuses 10 to develop applications that use various functions of the image forming apparatus 30A, verifies operations of the applications under development, and so forth.

Each server apparatus 20 responds to requests from the terminal apparatuses 10, to execute applications under development to provide services using various functions of the image forming apparatus 30A. Thus, the developers or the like can verify operations of the applications under development by using the terminal apparatuses 10.

Each image forming apparatus 30A is an apparatus such as a MFP (Multiple Function Peripheral) having various functions such as a printing function, a scanning function, a copying function, a facsimile communications function, and so forth. The image forming apparatus 30A receives requests from applications via a Web API, and provides various functions to the applications, respectively.

<Hardware Configuration>

A hardware configuration of the image forming apparatus 30A will be described with reference to FIG. 3 described above concerning the first embodiment. The hardware configuration of the image forming apparatus 30A is the same as the hardware configuration of the image forming apparatus 30 according to the first embodiment described above.

Also the image forming apparatus 30A according to the second embodiment implements various processes described later using the hardware configuration illustrated in FIG. 3.

<Functional Configuration>

Figure 10:
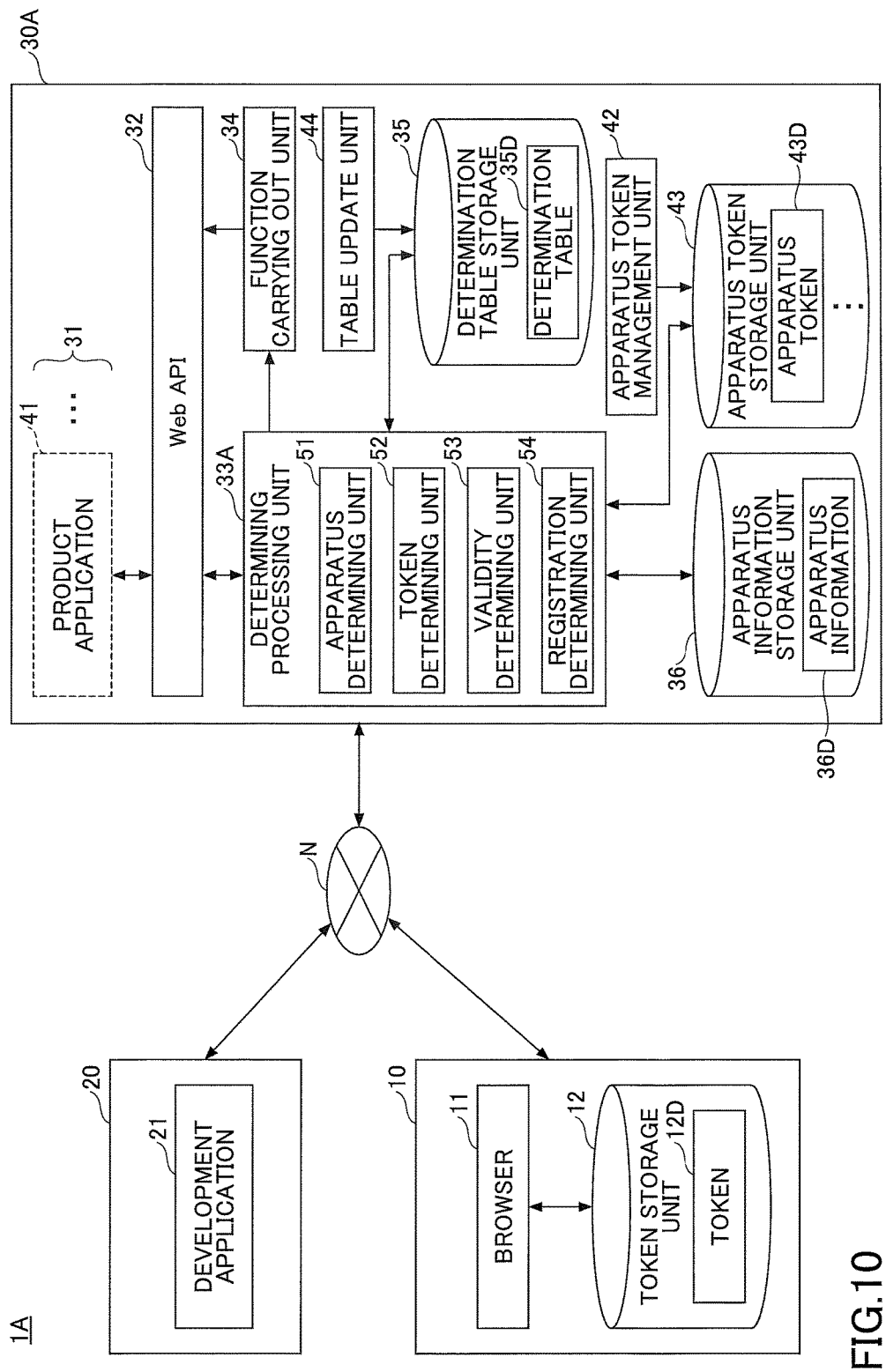
FIG. 10 illustrates a functional configuration of an information processing system according to a second embodiment.

Next, a functional configuration of the information processing system 1A according to the second embodiment will be described with reference to FIG. 10. FIG. 10 illustrates a functional configuration of the information processing system 1A according to the second embodiment.

As illustrated in FIG. 10, the terminal apparatus 10 according to the second embodiment includes a browser 11 implemented by, for example, a CPU 106 and so forth. The user of the terminal apparatus 10 can cause a development application 21 described later to be executed (that is, for example, verifies operations of the development application 21).

Also, the terminal apparatus 10 includes a token storage unit 12. The token storage unit 12 can be implemented by, for example, the HDD 108. The token storage unit 12 stores a "development token 12D" or a "product token 12D" issued by a vendor who manufactures the image forming apparatus 30A or the like. The user of the terminal apparatus 10 can receive a service provided by an application using one of the various functions of the image forming apparatus 30A by transmitting a request that includes the token 12D through the browser 11 to the application.

The token 12D stored in the token storage unit 12 can be the same as the token 12D described above concerning the first embodiment with reference to FIG. 5.

The "development token" is a token for authentication to be used by an application under development (that is, the development application 21) to use various functions of the image forming apparatus 30A. On the other hand, the "product token" is a token for authentication used by an application for which development has been completed (that is, for example, a product application 41 that has been released as a product) to use various functions of the image forming apparatus 30A. The "development tokens" include tokens to be used for evaluating the development application 21 (for example, used for an operation test of the development application 21) (i.e., a token for evaluation). Therefore, the actual names "development token" and "product token" are merely for convenience, and the actual names can be any other names.

As illustrated in FIG. 10, the server apparatus 20 according to the second embodiment includes the development application 21 executed by, for example, the CPU 106. The development application 21 is an application program that provides a service by using one of the various functions of the image forming apparatus 30A, and is under development by a third-party vendor or the like.

As illustrated in FIG. 10, the image forming apparatus 30A according to the second embodiment includes an application group 31 that provide services by using various functions of the image forming apparatus 30A. After the development of the development application 21 is completed, the development application 21 is downloaded as the product application 41 from, for example, the server apparatus 20 to the image forming apparatus 30A, and is installed in the image forming apparatus 30A. The application group 31 includes various applications such as a copying application that provides a copying service using a copying function of the image forming apparatus 30A, a printing application that provides a printing service using a printing function, and so forth. However, an embodiment is not limited to the case where the application group 31 includes a plurality of applications. That is, the application group 31 includes one or more applications.

Also, image forming apparatus 30A includes a Web API 32, a determining processing unit 33A, a function carrying out unit 34, an apparatus token management unit 42, and a table update unit 44. These functional units are implemented as a result of one or more programs installed in the image forming apparatus 30A being executed by the CPU 211.

The image forming apparatus 30A further includes a determination table storage unit 35, an apparatus information storage unit 36, and an apparatus token storage unit 43. These storage units can be implemented by using, for example, the HDD 215. It is also possible that at least one storage unit of these storage units is implemented by a storage device or the like that is connected to the image forming apparatus 30A via a network.

The Web API 32 is an API for the development application 21 and the respective applications included in the application group 31 to use the various functions of the image forming apparatus 30A. The development application 21 and so forth send various requests in a form of HTTP requests to the Web API 32, to use the various functions of the image forming apparatus 30A (for example, the scanning function, the facsimile communications function, and so forth).

That is, for example, the development application 21 uses the token 12D included in a HTTP request received from the browser 11, and transmits a HTTP request to the Web API 32. Then, if a determining processing unit 33A described later has determines that the token 12D is valid, the development application 21 can use one of the various functions of the image forming apparatus 30A.

The determining processing unit 33A determines whether the token 12D included in a request received from the development application 21 or the like through the Web API 32 is usable. The determining processing unit 33A includes an apparatus determining unit 51, a token determining unit 52, a validity determining unit 53, and a registration determining unit 54.

The apparatus determining unit 51 acquires apparatus information 36D from the apparatus information storage unit 36, and determines the type of the image forming apparatus 30A from the apparatus information 36D. The types of the image forming apparatus 30A include "development version" indicating an apparatus used for verifying operations of the development application 21 or the like (that is, for example, an apparatus for testing) and "product version" indicating an apparatus to be sold, leased, or the like, as a product.

The token determining unit 52 determines the type of a token 12D. The types of a token 12D include, as described above, a "development token" indicating a token used by the development application 21 and a "product token" indicating a token used by the product application 41.

The validity determining unit 53 acquires a determination table 35D from the determination table storage unit 35. Then, the validity determining unit 53 determines validity of a token 12D based on the acquired determination table 35D, the type of the image forming apparatus 30A determined by the apparatus determining unit 51, and the type of the token 12D determined by the token determining unit 52, in the same way as the first embodiment described above.

If the validity determining unit 53 determines that a token 12D is valid, the determining processing unit 33A determines that the token 12D is usable.

Thus, as a result of the validity determining unit 53 determining validity of a token 12D, it is possible to avoid such a situation that, for example, the various functions of the image forming apparatus 30A of development version is used by using the product token 12D.

If the validity determining unit 53 determines that a token 12D is invalid, the registration determining unit 54 determines whether the apparatus token 43D corresponding to the token 12D is stored in the apparatus token storage unit 43.

The apparatus token 43D includes the same token value as the development token 12D, and is registered with the image forming apparatus 30A. Therefore, the registration determining unit 54 determines whether the apparatus token 43D having the same token value as the token 12D determined by the validity determining unit 53 as invalid is registered with the image forming apparatus 30A.

If the registration determining unit 54 determines that the apparatus token 43D corresponding to the token 12D is stored in the apparatus token storage unit 43, the determining processing unit 33A determines that the token 12D is usable. On the other hand, if the registration determining unit 54 determines that no apparatus token 43D corresponding to the token 12D is stored in the apparatus token storage unit 43, the determining processing unit 33A determines that the token 12D is unusable.

Thus, even a token 12D that is determined by the validity determining unit 53 as invalid is determined by the determining processing unit 33A as usable if the apparatus token 43D corresponding to the token 12D is registered with the image forming apparatus 30A. Therefore, for example, it is possible to avoid such a situation in which various functions of the image forming apparatus 30A of product version are used with a development token 12D. Also, in the example, it is possible to use the various functions of the image forming apparatus 30A of product version with the development token 12D as a result of a corresponding apparatus token 43D being registered.

Therefore, for example, a developer of the development application 21 or the like can carry out a test (i.e., an operation test assuming a situation where the development application 21 has been released as a product, or the like) using respective functions of the image forming apparatus 30A of product version with a development token 12D.

The function carrying out unit 34 carries out the corresponding one of the various functions of the image forming apparatus 30A according to the determination result of the determining processing unit 33A.

The apparatus token management unit 42 carries out registration or updating the apparatus token 43D. For example, the apparatus token management unit 42 registers the apparatus token 43D by storing the apparatus token 43D in the apparatus token storage unit 43. Also, for example, the apparatus token management unit 42 updates the apparatus token 43D by editing the apparatus token 43D stored in the apparatus token storage unit 43. Actually, registration, updating, or the like, of the apparatus token 43D is made by a vendor who manufactures the image forming apparatus 30A or the like, in response to a request from, for example, a third-party vendor who develops the development application 21 or the like.

The table update unit 44 updates the determination table 35D stored in the determination table storage unit 35. For example, the table update unit 44 updates the determination table 35D by editing the determination table 35D stored in the determination table storage unit 35. Actually, updating the determination table 35D is made by, for example, a vendor who manufactures the image forming apparatus 30A or the like in response to a request of a third-party vendor who develops the development application 21 or the like.

The determination table storage unit 35 stores the determination table 35D. The determination table 35D stored in the determination table storage unit 35 can be the same as the determination table 35D described above concerning the first embodiment with reference to FIG. 9.

The apparatus information storage unit 36 stores the apparatus information 36D that includes various sorts of information concerning the image forming apparatus 30A. The apparatus information 36D stored in the apparatus information storage unit 36 will now be described with reference to FIG. 6. FIG. 6 illustrates one example of the apparatus information 36D.

As illustrated in FIG. 6, the apparatus information 36D includes a serial number, a version, and so forth. As the serial number, a value indicating identification information (for example, the unique production number, or the like) that uniquely identities the image forming apparatus 30A is set. As the version, a value indicating the version number of the image forming apparatus 30A is set. In addition, the apparatus information 36D may further include various sorts of information such as information that indicates the performance of the image forming apparatus 30A.

The apparatus token storage unit 43 stores the apparatus token 43D. The apparatus token storage unit 43 may store a plurality of the apparatus tokens 43D.

Figure 11:
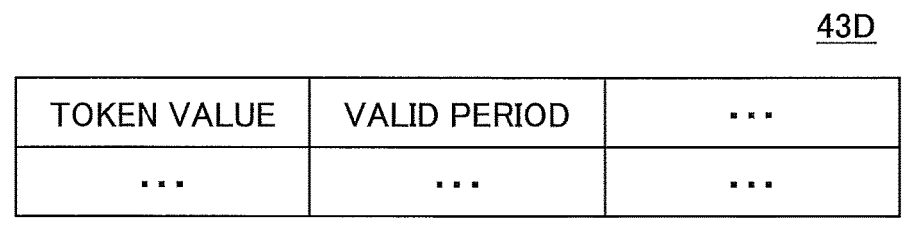

The apparatus token 43D stored in the apparatus token storage unit 43 will now be described with reference to FIG. 11. FIG. 11 illustrates one example of the apparatus token 43D.

As illustrated in FIG. 11, the apparatus token 43D includes a token value and a valid period. As the token value, a value indicating a character string used for authentication is set. As the valid period, a value indicating a period of time during which the token value can be used for authentication is set.

<Process Detail>

Figure 12:
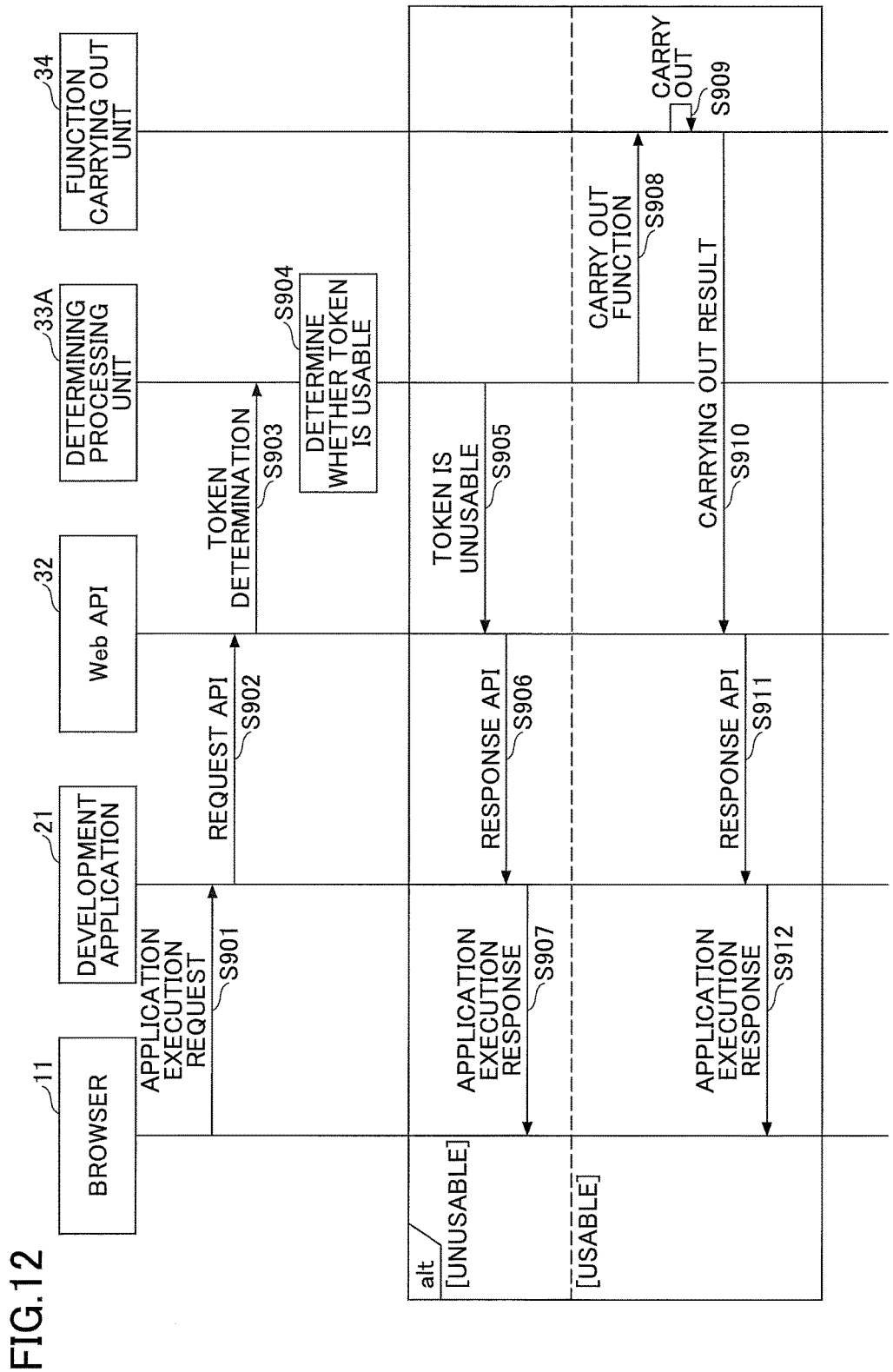
FIG. 12 is a sequence diagram illustrating one example of a process carried out by a development application.

Next, a process of the information processing system 1A according to the second embodiment will be described in detail. First, a case where the user of the terminal apparatus 10 (a developer of the development application 21, or the like) causes the development application 21 to be executed, to verify operations of the development application 21 will be described with reference to FIG. 12. FIG. 12 is a sequence diagram illustrating one example of a process carried out by the development application 21.

First, the user operates the browser 11 of the terminal apparatus 10 to execute the development application 21. As a result, the browser 11 of the terminal apparatus 10 transmits a request to the development application 21 of the server apparatus 20 to execute the application 21 (step S901). The request includes a token 12D. Note that the browser 11 transmits the request in a form of a HTTP request.

In response to receiving the request, the development application 21 of the server apparatus 20 transmits a request API to the Web API 32 of the image forming apparatus 30A (step S902). The request API is a request to use a function of the image forming apparatus 30A, and includes the token 12D. Note that the development application 21 transmits the request API in a form of a HTTP request.

In response to receiving the request API, the Web API 32 of the image forming apparatus 30A transmits a request to the determining processing unit 33A to determine whether the token 12D included in the request API is usable (step S903).

In response to receiving the request, the determining processing unit 33A of the image forming apparatus 30A determines whether the token is usable (step S904). That is, the determining processing unit 33A determines whether the token 12D included in the request API is usable. The process of determining whether a token is usable will be described later in detail.

If it is determined in step S904 that the token 12D is not usable (that is, if it is determined that the token 12D is unusable), steps S905-S907 are carried out. That is, first, the determining processing unit 33A of the image forming apparatus 30A transmits the determination result that the token 12D included in the request API is unusable to the Web API 32 (step S905).

In response to receiving the determination result, the Web API 32 of the image forming apparatus 30A transmits a response API indicating that the token 12D is unusable to the development application 21 (step S906).

Finally, in response to receiving the response API indicating that the token 12D is unusable, the development application 21 in the server apparatus 20 transmits an application execution response indicating that the token 12D is unusable to the browser 11 (step S907). Thereby, the display device 102 of the terminal apparatus 10 displays, by the browser 11, that, for example, "it is not possible to access the image forming apparatus 30A".

On the other hand, if it is determined in step S904 that the token 12D is usable, steps S908-S912 are carried out. That is, first, the determining processing unit 33A of the image forming apparatus 30A transmits a request to carry out a function corresponding to the request API to the function carrying out unit 34 (step S908).

In response to receiving the request, the function carrying out unit 34 of the image forming apparatus 30A carries out the function according to the request (step S909). That is, the function carrying out unit 34 carries out, for example, one of the various functions of the image forming apparatus 30A, such as the scanning function, the copying function, or the facsimile communications function, in response to the request.

Next, the function carrying out unit 34 of the image forming apparatus 30A transmits a result of carrying out the function in step S909 to the Web API 32 (step S910). The result of carrying out the function includes, for example, image data generated through reading an original document through the scanning function if the scanning function is carried out in step S909.

Next, the Web API 32 of the image forming apparatus 30A transmits a response API including the result of carrying out the function to the development application 21 (step S911).

Finally, in response to receiving the response API including the result of carrying out the function, the development application 21 of the server apparatus 20 carries out, for example, a process based on the result of carrying out the function, and transmits an application execution response including the result of the thus carried out process to the browser 11 (step S912). The process thus carried out is a process unique to the development application 21, and, for example, a process of modifying the image data generated through the scanning function.

Then, the display device 102 of the terminal apparatus 10 displays, by the browser 11, for example, the result of the process carried out by the development application 21, and so forth. Thus, to the user of the terminal apparatus 10, the development application 21 provides services using various functions of the image forming apparatus 30A.

With reference to FIG. 12, the case where the development application 21 uses one of various functions of the image forming apparatus 30A has been described. However, the second embodiment is not limited to this case. For example, the process of FIG. 12 may also be applied to a case where the product application 41 uses one of various functions of the image forming apparatus 30A in the same way. That is, for example, the process of FIG. 12 may also be applied to a case where the product application 41 installed in the image forming apparatus 30A or the terminal apparatus 10 transmits a request API in the same way.

Figure 13:
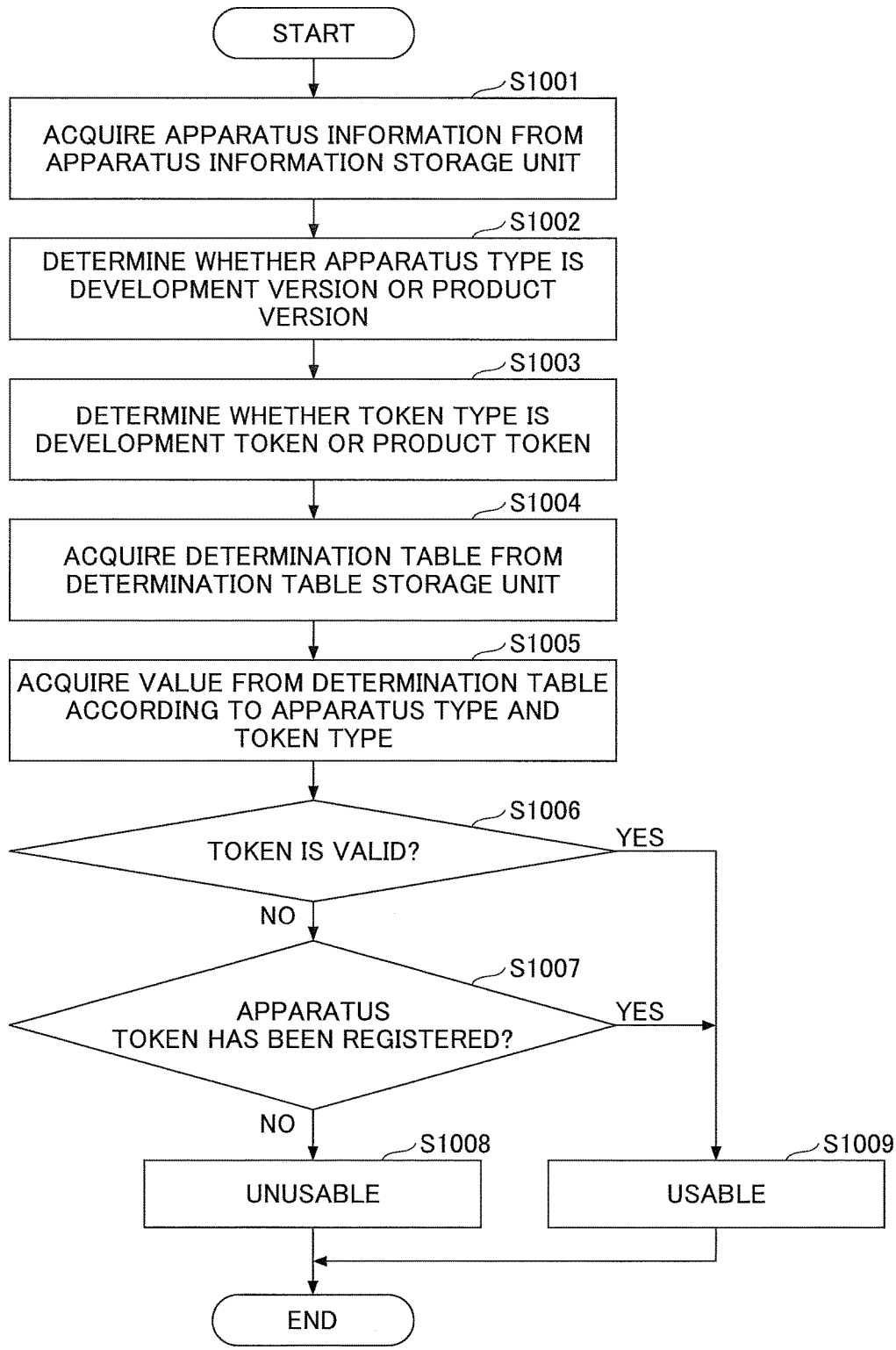
FIG. 13 is a flowchart illustrating one example of a token usability determining process.

Below, the process of step S904 to determine whether a token is usable will be described in detail with reference to FIG. 13. FIG. 13 is a flowchart illustrating one example of the token usability determining process.

First, the apparatus determining unit 51 of the determining processing unit 33A acquires the apparatus information 36D from the apparatus information storage unit 36 (step S1001).

Next, the apparatus determining unit 51 of the determining processing unit 33A determines the type of the image forming apparatus 30A from the apparatus information 36D acquired in step S1001 (step S1002).

Note that the apparatus determining unit 51 determines, based on the serial number or the version included in the apparatus information 36D, the type of the image forming apparatus 30A (that is, the apparatus determining unit 51 determines whether the image forming apparatus 30A is an apparatus of "development version" or "product version"), in the same way as the way of step S802 in FIG. 8 described above concerning the first embodiment.

Thus, the apparatus determining unit 51 determines, based on various sorts of information such as the serial number or the version included in the apparatus information 36D, the type of the image forming apparatus 30A.

Next, the token determining unit 52 of the determining processing unit 33A determines the type of the token 12D included in the request API received by the Web API 32 (step S1003), in the same way as the way of step S803 in FIG. 8 concerning the first embodiment.

Thus, the token determining unit 52 determines, based on various sorts of information such as the type flag included in the token 12D, the type of the token 12D.

Next, the validity determining unit 53 of the determining processing unit 33A acquires the determination table 35D from the determination table storage unit 35 (step S1004).

Next, the validity determining unit 53 of the determining processing unit 33A acquires the information item (value), from the determination table 35D acquired in step S1004, corresponding to the combination of the type of the image forming apparatus 30A and the type of the token 12D (step S1005).

That is, the validity determining unit 53 reads the value ("valid" or "invalid"), corresponding to the combination of the type of the image forming apparatus 30A determined in step S1002 and the type of the token 12D determined in step S1003, from the determination table 35D.

Then, the validity determining unit 53 determines whether the token 12D is valid (either "valid" or "invalid") based on the value acquired in step S1005 (step S1006). That is, the validity determining unit 53 determines that the token 12D is valid if the value acquired in step S1005 is "valid". On the other hand, the validity determining unit 53 determines that the token 12D is not valid (i.e., the token 12D is invalid) if the value acquired in step S1005 is "invalid".

Note that, in step S1006, if the valid period included in the token 12D has been expired, the validity determining unit 53 determines that the token 12D is invalid.

In step S1006, if the validity determining unit 53 determines that the token 12D is invalid, the registration determining unit 54 determines whether the apparatus token 43D corresponding to the token 12D has been registered in the image forming apparatus 30A (step S1007). That is, the registration determining unit 54 determines whether the apparatus token 43D having the same token value as the token value included in the token 12D is stored in the apparatus token storage unit 43.

If the registration determining unit 54 determines in step S1007 that the apparatus token 43D has not been registered, the determining processing unit 33A determines that the token 12D is unusable (step S1008). Thus, the determining processing unit 33A determines that the token 12D is unusable when the token 12D is invalid, and no apparatus token 43D corresponding to the token 12D has been registered.

On the other hand, in step S1006, if the validity determining unit 53 determines that the token 12D is valid, the determining processing unit 33A determines that the token 12D is usable. In the same way, in step S1007, if the registration determining unit 54 determines that the apparatus token 43D has been registered, the determining processing unit 33A determines that the token 12D is usable (step S1009). Thus, the determining processing unit 33A determines that the token 12D is usable when the token 12D is determined as being valid. Also, even if the token 12D is determined as being invalid, the determining processing unit 33A determines that the token 12D is usable when the apparatus token 43D corresponding to the token 12D has been registered. In other words, the determining processing unit 33A determines that the token 12D is usable when the apparatus token 43D corresponding to the token 12D has been registered in the image forming apparatus 30A.

Thus, in the information processing system 1A according to the second embodiment, it is determined whether the token 12D is valid according to the combination of the type of the image forming apparatus 30A and the type of the token 12D. Then, in the information processing system 1A according to the second embodiment, if it is determined that the token 12D is valid, the token 12D is determined usable.

Also, in the information processing system 1A according to the second embodiment, even if the token 12D is determined invalid, the token 12D is determined usable if the apparatus token 43D corresponding to the token 12D has been registered in the image forming apparatus 30A.

Therefore, in the information processing system 1A according to the second embodiment, for example, it is possible to avoid such a situation that the development application 21 uses a "product token 12D" to use various functions of an image forming apparatus 30A of "development version". In the same way, in the information processing system 1A according to the second embodiment, for example, it is possible to avoid such a situation that the development application 21 uses a "development token 12D" to use various functions of an image forming apparatus 30A of "product version".

Also, in the information processing system 1A according to the second embodiment, for example, it is possible to avoid such a situation the product application 41 uses a "development token 12D" to use various functions of an image forming apparatus 30A of "product version". In the same way, in the information processing system 1A according to the second embodiment, for example, it is possible to avoid such a situation that that the product application 41 uses a "product token 12D" to use various functions of an image forming apparatus 30A of "development version".

On the other hand, in the information processing system 1A according to the second embodiment, for example, if the development application 21 is desired to use a "development token 12D" to use various functions of an image forming apparatus 30A of "product version" (for example, for the purpose of carrying out an operation test), the corresponding apparatus token 43D can be previously registered for this purpose.

Thus, according to the information processing system 1A of the second embodiment, it is possible to avoid unauthorized use of a "product token 12D" or a "development token 12D", while it is possible to flexibly deal with development of the development application 21.

Figure 14:
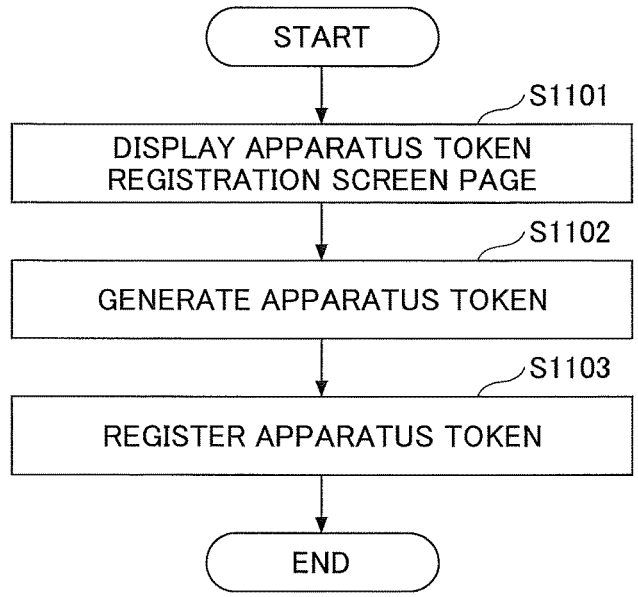
FIG. 14 is a flowchart illustrating one example of an apparatus token registration process.

Next, a case of registering an apparatus token 43D in the image forming apparatus 30A will be described with reference to FIG. 14. FIG. 14 is a flowchart illustrating one example of an apparatus token registration process.

Figure 15:
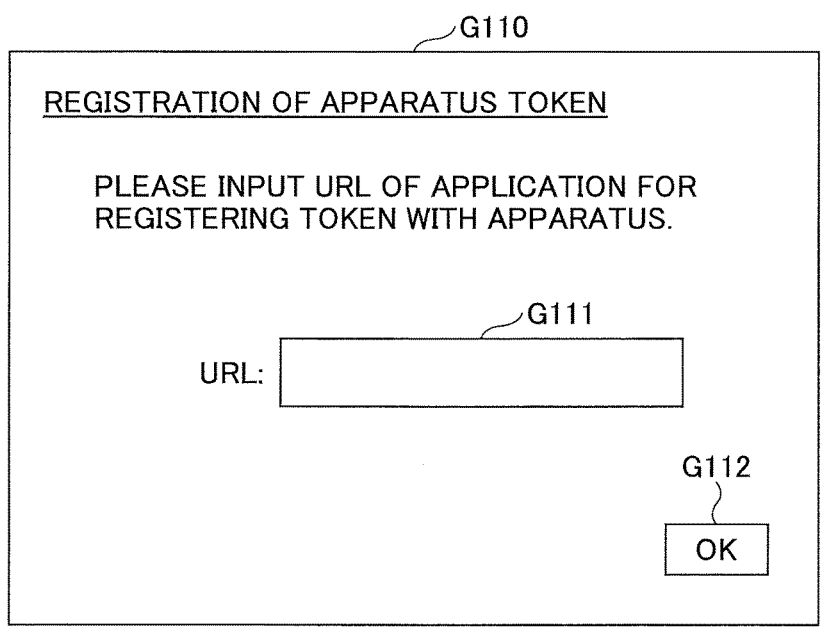
FIGS. 15 and 16 illustrate example of an apparatus token registration screen page.

First, the apparatus token management unit 42D displays an apparatus token registration screen page G110, for example, illustrated in FIG. 15 (step S1101).

The apparatus token registration screen page G110 illustrated in FIG. 15 is a screen page for a person in charge such as a vendor who manufactures the image forming apparatus 30A or the like to register an apparatus token 43D, and includes an URL input field to input a URL (Uniform Resource Locator) of the development application 21, and an OK button G112 for registering an apparatus token 43D.

The person in charge such as the vendor who manufactures the image forming apparatus 30A or the like inputs the URL of the development application 21 in the URL input field G111, in response to a request from a developer of a third-party vendor or the like who develops the development application 21 or the like, and presses the OK button G112. Thus, the person in charge as the vendor who manufactures the image forming apparatus 30A or the like registers the apparatus token 43D. Note that, the apparatus token management unit 42 may display the apparatus token registration screen page G110 of FIG. 15 on the operation panel 202 of the image forming apparatus 30A, or may display the apparatus token registration screen page G110 of FIG. 15 on an information processing terminal or the like externally connected with the image forming apparatus 30A via a network.

Note that the URL to be input to the URL input field G111 is, for example, the same as the URL used when the development token 12D is generated for being used by the development application 21.

Next, the apparatus token management unit 42 responds to the operation to register the apparatus token 43D, to generate the apparatus token 43D based on the URL that has been input to the URL input field G111 (step S1102). Thus, the apparatus token management unit 42 generates the apparatus token 43D having the token value the same as the token value of the development token 12D to be used by the development application 21.

The apparatus token management unit 42 sets the valid period of a certain number of days (for example, in a range between a few days and a few weeks) during which the generated apparatus token 43D is valid. Thus, it is possible to register, with the image forming apparatus 30A, an apparatus token 43D that is valid, for example, during an operation test of the development application 21. The apparatus token management unit 42 may discard a registered apparatus token 43D from the apparatus token storage unit 43 when the valid period of the same apparatus token 43D has been expired.

Next, the apparatus token management unit 42 registers the apparatus token 43D generated in step S1102 with the image forming apparatus 30A (step S1103). That is, the apparatus token management unit 42 stores the apparatus token 43D generated in step S1102 in the apparatus token storage unit 43.

Thus, the information processing system 1A according to the second embodiment registers the apparatus token 43D with the image forming apparatus 30A. Although the description has been made assuming that the person in charge such as the vendor who manufactures the image forming apparatus 30A or the like registers the apparatus token 43D using the apparatus token registration screen page G110 illustrated in FIG. 15, an embodiment is not limited to this example. For example, it is also possible that the apparatus token management unit 42 of the image forming apparatus 30A displays an apparatus token registration screen page G120 illustrated in FIG. 16 on the terminal apparatus 10, and a developer such as a third-party vendor or the like registers the apparatus token 43D from the apparatus token registration screen page G120.

Figure 16:
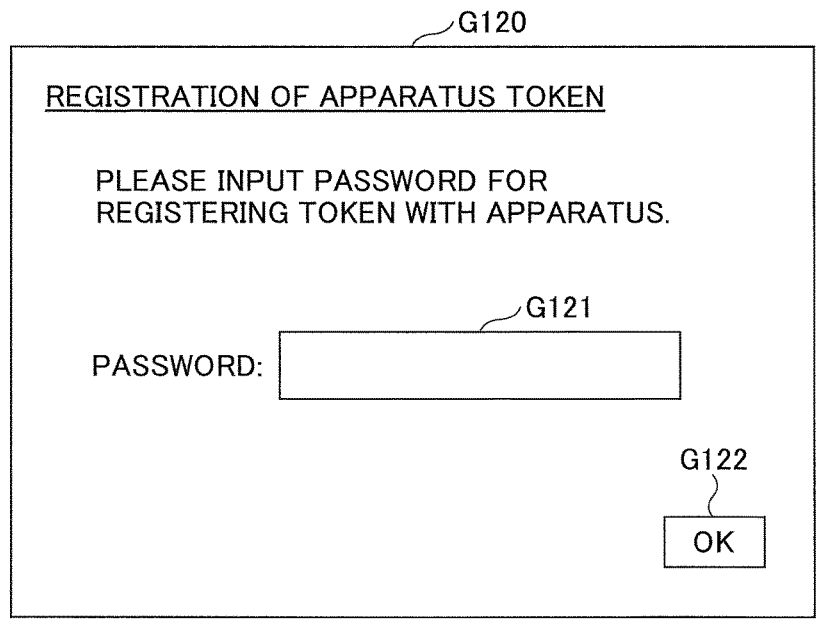

The apparatus token registration screen page G120 illustrated in FIG. 16 is a screen page for the developer such as a third-party vendor or the like to register the apparatus token 43D, and includes a password input field G121 and an OK button G122.

The developer such as a third-party vendor or the like who develops the development application 21 inputs a password issued by the vendor who manufactures the image forming apparatus 30A or the like in the password input field G121, and touches the OK button G122. Thus, the developer such as a third-party vendor or the like registers the apparatus token 43D. Then, in this case, in step S1102 of FIG. 14, the apparatus token management unit 42 generates an apparatus token 43D based on the password that is thus input to the password input field G121.

The password thus input to the password input field G121 is issued by the vendor who manufactures the image forming apparatus 30A or the like in response to a request from a third-party vendor or the like, for example. Therefore, the developer such as a third-party vendor or the like can previously receive the password from the vendor who manufactures the image forming apparatus 30 or the like, and register the apparatus token 43D, for performing an operation test of the development application 21, or the like.

Figure 17:
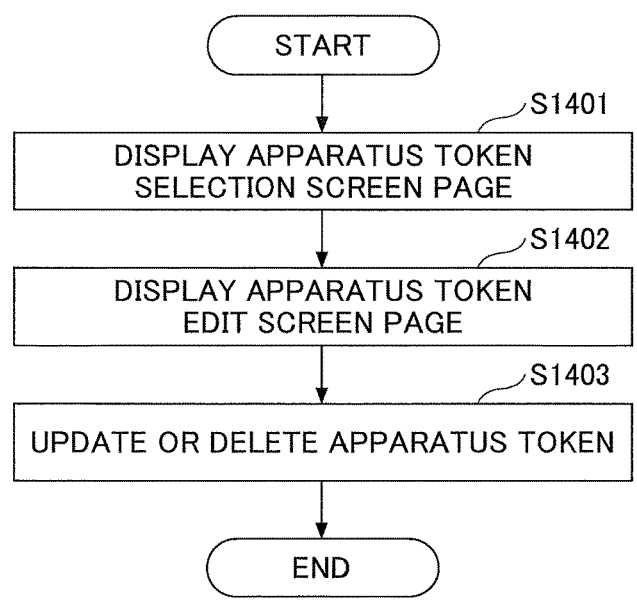
FIG. 17 is a flowchart illustrating one example of an apparatus token updating process.

Next, a case of updating or deleting an apparatus token 43D registered with the image forming apparatus 30A will be described with reference to FIG. 17. FIG. 17 is a flowchart illustrating one example of an apparatus token updating process.

Figure 18:
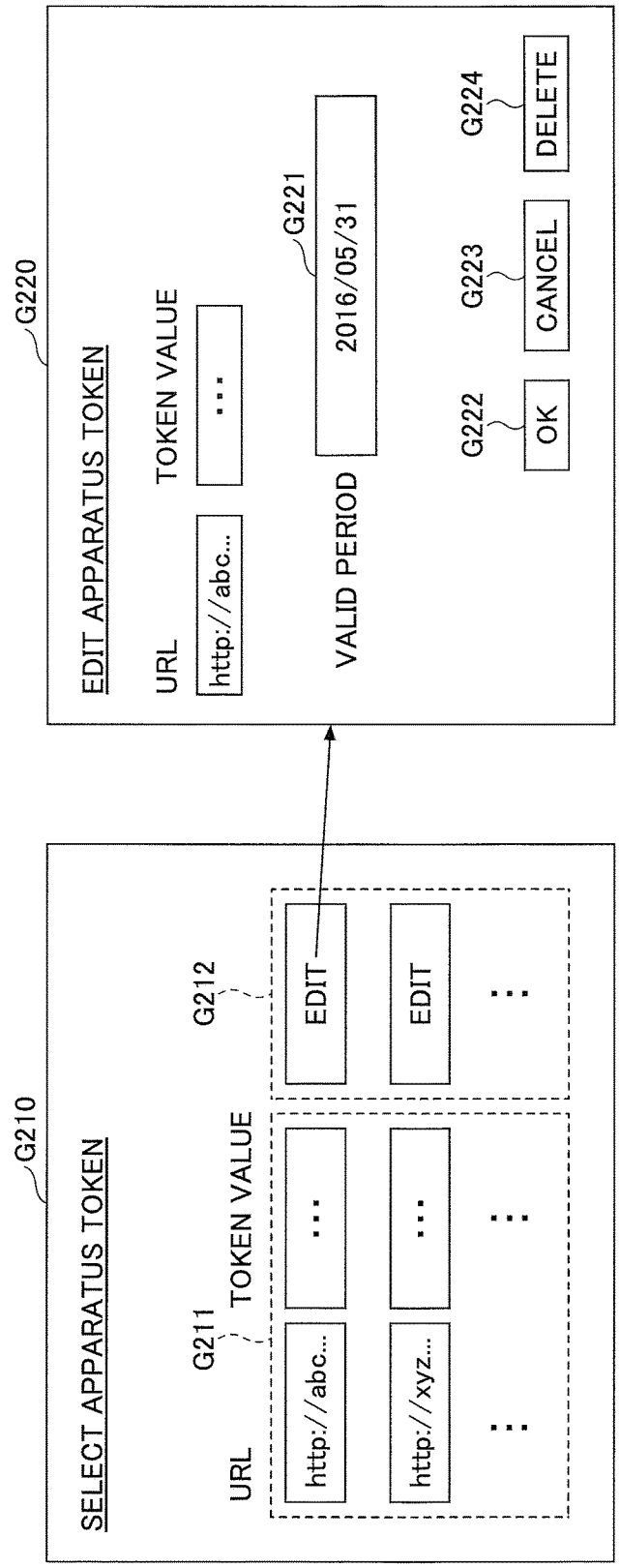
FIG. 18 illustrates one example of an apparatus token selection screen page and one example of an apparatus token edit screen page.

First, the apparatus token management unit 42 displays an apparatus token selection screen page G210, for example, illustrated in FIG. 18 (step S1401).

The apparatus token selection screen page G210 illustrated in FIG. 18 is a screen page for the person in charge such as the vendor who manufactures the image forming apparatus 30A or the like to select a apparatus token 43D to update or delete. The apparatus token selection screen page G210 of FIG. 18 includes an apparatus token list G211 where a list of apparatus tokens 43D stored in the apparatus token storage unit 43 are displayed, and edit buttons G212 for changing the screen page into an apparatus token edit screen page G220 which will be described later.

The person in charge such as the vendor who manufactures the image forming apparatus 30A or the like touches the edit button G212 corresponding to a desired one of the apparatus tokens 43D included in the apparatus token list G211. Thus, the person in charge such as the vendor who manufactures the image forming apparatus 30A or the like selects the apparatus token 43D to update or delete. Note that, the apparatus token management unit 42 may display the apparatus token selection screen page 6210 of FIG. 18 on the operation panel 202 of the image forming apparatus 30A, or on an information processing terminal or the like externally connected with the image forming apparatus 30A via a network.

After the apparatus token 43D is thus selected, the apparatus token management unit 42 displays the apparatus token edit screen page G220, for example, illustrated in FIG. 18 (step S1402).

The apparatus token edit screen page G220 of FIG. 18 is a screen page for updating or deleting the thus selected apparatus token 43D, and includes a valid period edit field G221, an OK button G222, a cancel button G223, and a delete button G224.

The person in charge such as the vendor who manufactures the image forming apparatus 30A or the like can edit the valid period editably displayed, and touch the OK button G222. Thus the selected apparatus token 43D can be updated. Also, the person in charge such as the vendor who manufactures the image forming apparatus 30A or the like can touch the delete button G224 to delete the selected apparatus token 43D. Also, the person in charge such as the vendor who manufactures the image forming apparatus 30A or the like can touch the cancel button G223 to return the displayed screen page into the apparatus token selection screen page G210.

After the operation to update or delete the apparatus token 43D is performed, the apparatus token management unit 42 updates or deletes the selected apparatus token 43D from among the apparatus tokens 43D stored in the apparatus token storage unit 43 (step S1403).

That is, after the operation to update the apparatus token 43D is performed, the apparatus token management unit 42 updates the valid period included in the selected apparatus token 43D. After the operation to delete the apparatus token 43D is performed, the apparatus token management unit 42 deletes the selected apparatus token 43D.

Thus, in the information processing system 1A according to the second embodiment, it is possible to update the apparatus tokens 43D registered with the image forming apparatus 30A. Therefore, for example, it is possible that, whereas the valid period of a development token 12D has been expired, the valid period of an apparatus token 43D has not been expired. Therefore, for example, in a stage of an operation test of the development application 21, or the like, such a setting can be made that, while the development application 21 has been already prevented from using an image forming apparatus 30A of development version, the development application 21 is permitted to use an image forming apparatus 30A of product version.

Also, in the information processing system 1A according to the second embodiment, it is possible to delete an apparatus token 43D registered with the image forming apparatus 30A. Therefore, for example, when an operation test of the development application 21 has been cancelled, the operation test has been finished earlier than a schedule, or the like, it is possible to delete the corresponding apparatus token 43D registered with the image forming apparatus 30A.

Figures 19, 20:
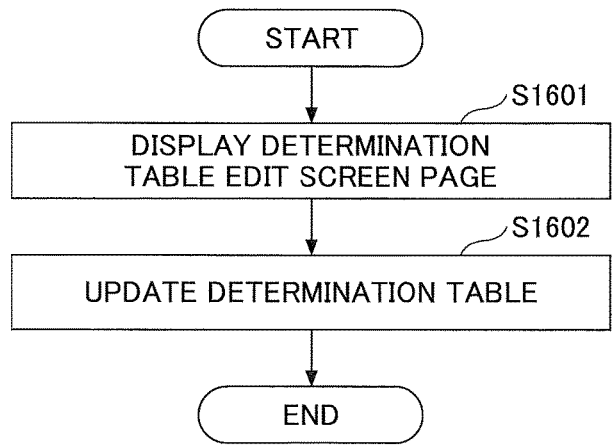
FIG. 19 illustrates one example of a process of updating a determination table.
FIG. 20 illustrates a determination table edit screen page.

Further, also as a result of a person in charge such as a vendor who manufactures the image forming apparatus 30A or the like updating the determination table 35D, the development application 21 comes to be able to use an image forming apparatus 30A of product version with a development token 12D. Therefore, below, a case of updating the determination table 35D stored in the determination table storage unit 35 will be described with reference to FIG. 19. FIG. 19 illustrates one example of a process of updating the determination table.

First, the table update unit 44 displays, for example, a determination table edit screen page G310, for example, illustrated in FIG. 20 (step S1601).

The determination table edit screen page G310 illustrated in FIG. 20 is a screen page for a person in charge such as a vendor who manufactures the image forming apparatus 30A or the like to update each item of the determination table 35D. The determination table edit screen page 6310 illustrated in FIG. 20 includes a table edit field G311 where each item of the determination table 35D is editably displayed, a valid period field G313 for setting a valid period of the thus updated determination table 35D, and an OK button G314.

The person in charge such as the vendor who manufactures the image forming apparatus 30A or the like responds to a request from the developer such as a third-party vendor or the like who develops the development application 21, to edit each item of the determination table 35D from the table edit field G311. For example, if the person in charge such as the vendor who manufactures the image forming apparatus 30A or the like wishes to edit the determination table 35D in a case where the type of the image forming apparatus 30A is "product version" and the type of the token 12D is a "product token", the person in charge such as the vendor who manufactures the image forming apparatus 30A or the like can select a desired value from a pull-down menu G312.

Thus, the person in charge such as the vendor who manufactures the image forming apparatus 30A selects an item of the determination table 35D to edit from the table edit field G311, and selects information (value) as an edited information (value) from the pull-down menu G312. Then, the person in charge such as the vendor who manufactures the image forming apparatus 30A touches the OK button G314. Thus, the person in charge such as the vendor who manufactures the image forming apparatus 30A updates the determination table 35D.

The table update unit 44 may display the determination table edit screen page G310 illustrated in FIG. 20 on the operation panel 202 of the image forming apparatus 30A or on an information processing terminal or the like externally connected with the image forming apparatus 30A via a network.

The person in charge such as the vendor who manufactures the image forming apparatus 30A or the like may input the valid period of the updated determination table 35D in the valid period field G313. If so, after the valid period thus input in the valid period field G313 is expired, the determination table 35D is returned into the state before being updated by the table update unit 44. Thus, the person in charge such as the vendor who manufactures the image forming apparatus 30A or the like can temporarily update the determination table 35D by inputting the valid period in the valid period field 6313.

After the user performs the operation to update the determination table 35D, the table update unit 44 updates the determination table 35D stored in the determination table storage unit 35 (step S1602).

Thus, in the information processing system 1A according to the second embodiment, it is possible to update each item of the determination table 35D. Therefore, for example, it is possible to make each item of determination table 35D stored in the determination table storage unit 35 as being "valid" during an operation test of the development application 21. Thus, in an operation test of the development application 21 or the like, the development application 21 comes to be able to use a development token 12D to use an image forming apparatus 30A of product version.

Third Embodiment

Next, a third embodiment of the present invention will be described. The third embodiment is different from the second embodiment in that a token 13D that includes information for determining whether the token is usable is stored in a token storage unit 12 of the terminal apparatus 10.

Concerning the third embodiment, to the elements that have the same functional configurations as the elements of the second embodiment and the elements that carry out substantially the same processes as the processes of the elements of the second embodiment, the same reference numerals as the reference numerals in the second embodiment are given, and the description of these elements will be omitted.

<Functional Configuration>

Figure 21:
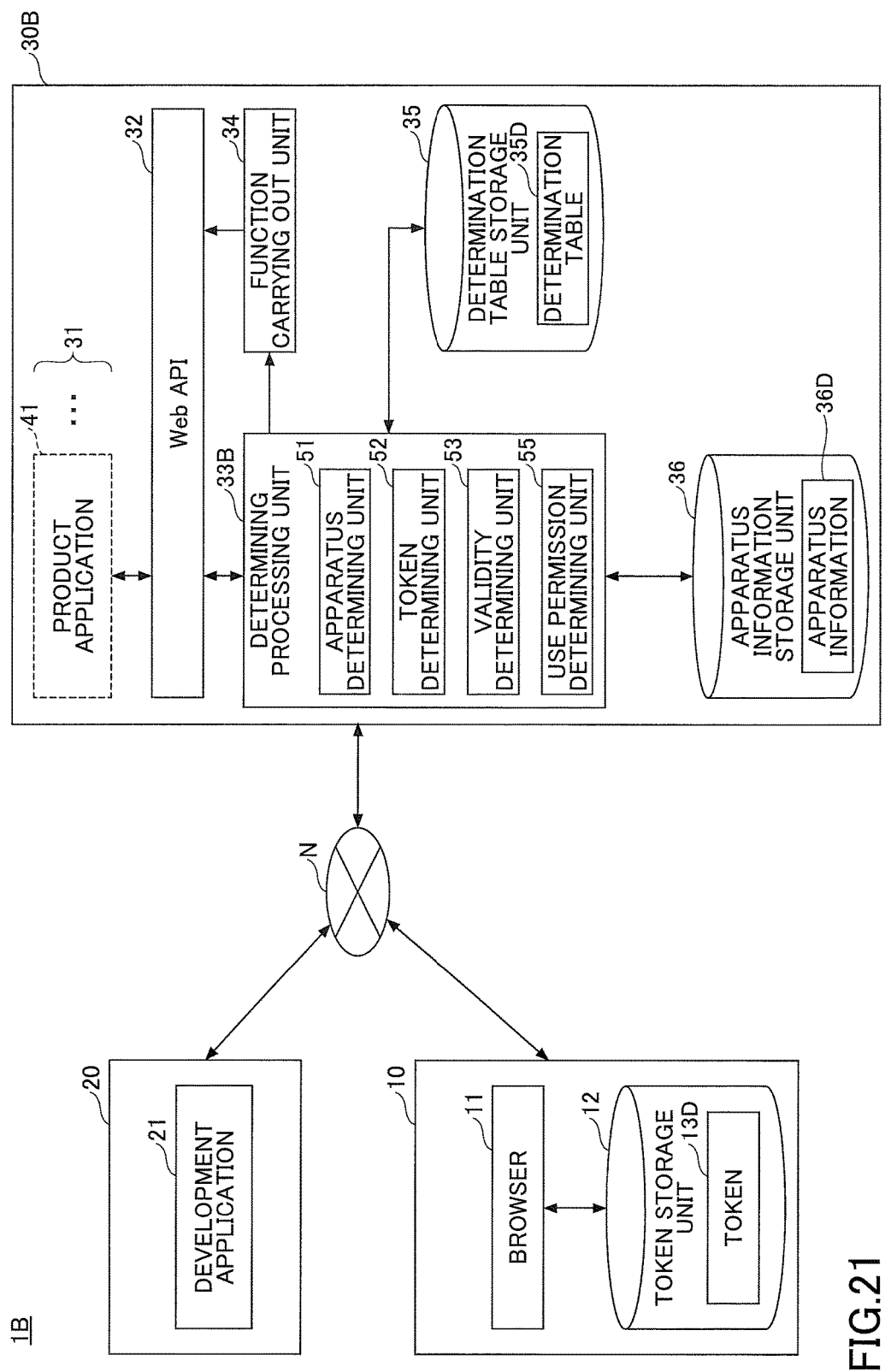
FIG. 21 illustrates a functional configuration of one example of an information processing system according to a third embodiment.

First, the functional configuration of an information processing system 1B according to the third embodiment will be described with reference to FIG. 21. FIG. 21 illustrates a functional configuration of one example of the information processing system 1B according to the third embodiment.

As illustrated in FIG. 21, a token 13D is stored in a token storage unit 12 of the terminal apparatus 10.

The token 13D stored in the token storage unit 12 will now be described in detail with reference to FIG. 22. FIG. 22 illustrates one example of a token.

As illustrated in FIG. 22, a token 13D further includes use permission information in comparison to a token 12D described above concerning the first and second embodiments. As the use permission information, for example, a value "true" that indicates that the token 13D is usable, a value "false" that indicates that the token 13D is unusable, or the like is set. Alternatively, the use permission information may be, for example, the serial number of an image forming apparatus 30B, or the like.

A token 13D is given by a vendor who manufactures the image forming apparatus 30B or the like in response to a request of, for example, a third-party vendor or the like. That is, for example, a developer such as a third-party vendor or the like transmits a token 12D such as that illustrated in FIG. 5 to the vendor who manufactures the image forming apparatus 30B or the like, to receive a token 13D, where use permission information is added to the token 12D, from the vendor who manufactures the image forming apparatus 30B.

As illustrated in FIG. 21, a determining processing unit 33B of the image forming apparatus 30B includes a use permission determining unit 55. The use permission determining unit 55 determines whether the use permission information included in a token 13D is "true" if the validity determining unit 53 has determined that the token 13D is invalid.

Note that, if the use permission information is the serial number of the image forming apparatus 30B, the use permission determining unit 55 can make a determination as to whether the use permission information is the same as the serial number included in the apparatus information 36D stored in the apparatus information storage unit 36.

<Process Detail>

Figure 23:
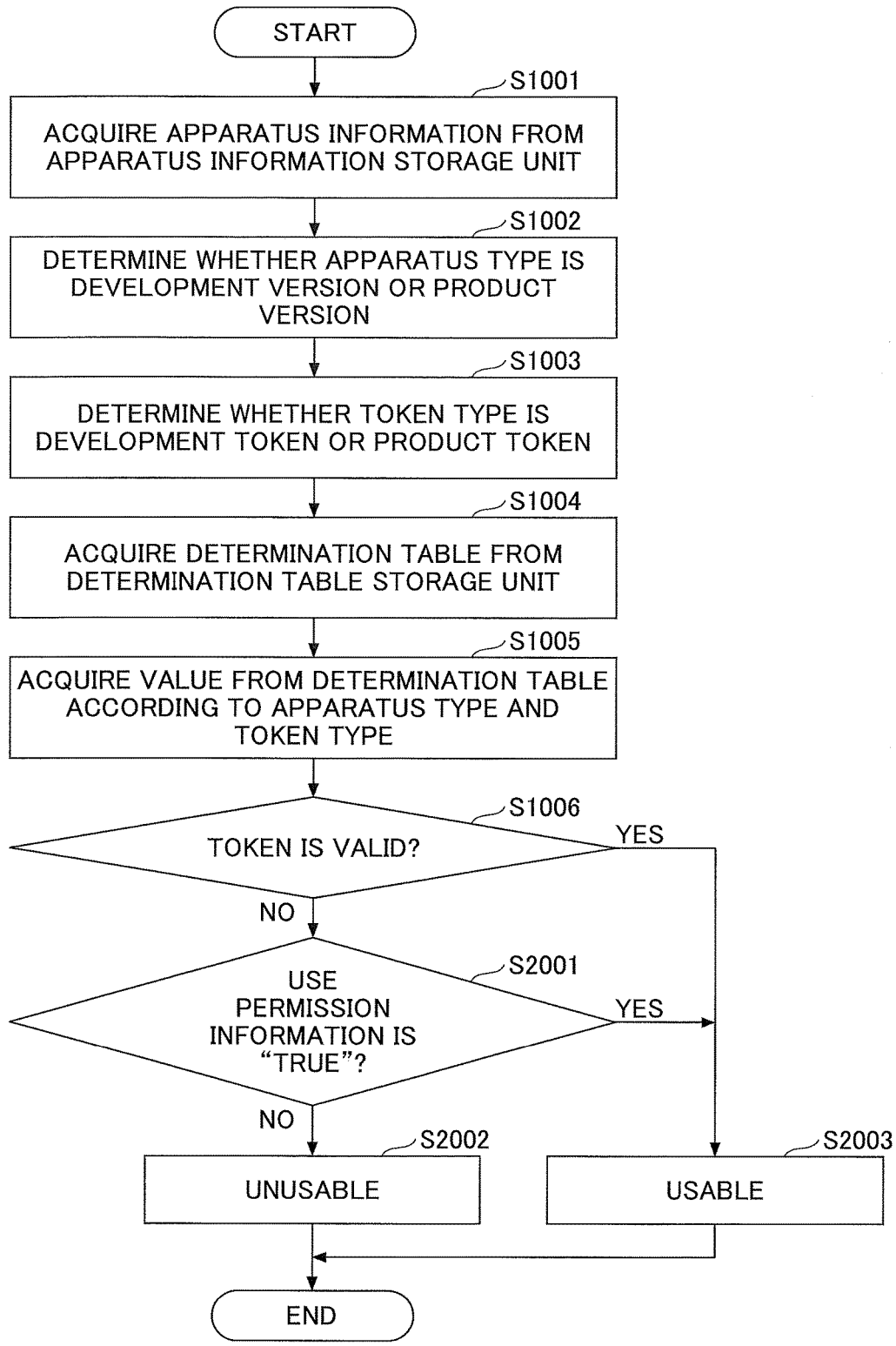
FIG. 23 is a flowchart illustrating one example of a token usability determining process.

Next, a process of the information processing system 1B according to the third embodiment will be described in detail. Below, the token usability determining process of step S904 in FIG. 12, described above for the second embodiment, according to the third embodiment, will be described in detail with reference to FIG. 23. FIG. 23 is a flowchart illustrating one example of the token usability determining process according to the third embodiment. Steps S1001-S1006 are the same as steps S1001-S1006 of the second embodiment after a "token 12D" is read as a "token 13D". Therefore, the description will be omitted.

In step S1006, if the validity determining unit 53 determines that the token 13D is invalid, the use permission determining unit 55 determines whether the use permission information included in the token 13D is "true" (step S2001).

If the use permission information included in the token 13D is the serial number of the image forming apparatus 30B, the use permission determining unit 55 determines whether the serial number is the same as the serial number included in the apparatus information 36D stored in the apparatus information storage unit 36.

In step S2001, if the use permission determining unit 55 determines that the use permission information is not "true" (or the serial numbers are determined not being the same as one another), the determining processing unit 33B determines that the token 13D is unusable (step S2002). Thus, if the token 13D is invalid and the use permission information included in the token 13D is not "true", the determining processing unit 33B determines that the token 13D is unusable.

On the other hand, in step S1006, if the validity determining unit 53 determines that the token 13D is valid, the determining processing unit 33B determines that the token 13D is usable. Also, in step S2001, if the use permission determining unit 55 determines that the use permission information is "true" (or the serial numbers are determined as being the same as one another), the determining processing unit 33B determines that the token 13D is usable (step S2003). Thus, even if the token 13D is determined as being invalid, the determining processing unit 33B determines the token 13D as being usable if the use permission information included in the token 13D is "true" (or the use permission information is the same as the serial number of the image forming apparatus 30B).

Thus, in the information processing system 1B according to the third embodiment, a token 13D is determined as being usable if predetermined information is set as use permission information included in the token 13D even if the token 13D is determined as being invalid. Therefore, in the information processing system 1B according to the third embodiment, for example, in order to carry out an operation test of the development application 21, a developer such as a third-party vendor or the like acquires a token 13D from the vendor who manufactures the image forming apparatus 30B or the like for this purpose.

Thus, according to the second and third embodiments, it is possible to avoid a token from being used in an unauthorized manner, while flexibly dealing with a particular situation to permit use of the token as appropriate.

The information processing systems, the information processing methods, and the non-transitory computer program products have been have been described in the embodiments. However, embodiments are not limited to the above-described embodiments, and various modifications and replacements may be made.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, each circuit may include a processor programmed by software to execute the corresponding functions and hardware which is designed to execute the corresponding functions such as the ASIC or the circuit module.

What is claimed is:

1. An information processing system comprising:
   an apparatus configured to carry out a function;
   an application program configured to provide a service using the function; and
   one or more processors configured to:
   receive a request, transmitted from the application program, to carry out the function,
   determine a type of an authentication token included in the request, in response to receiving the request,
   determine a type of the apparatus,
   determine whether the authentication token is valid based on the determined type of the authentication token and the determined type of the apparatus, and
   cause the apparatus to carry out the function corresponding to the request if the authentication token is determined as being valid.

2. The information processing system according to claim 1, wherein
   the one or more processors are further configured to
   in response to receiving the request, determine the type of the authentication token included in the request by determining whether the authentication token is an authentication token used by the application program under development to use the function or an authentication token used by the application program that has become a product to use the function.

3. The information processing system according to claim 2, wherein
   the one or more processors are further configured to
   determine the type of the authentication token based on information included in the authentication token.

4. The information processing system according to claim 1, wherein
   the one or more processors are further configured to
   determine the type of the apparatus by determining whether the apparatus is an apparatus that provides the function to the application program under development or an apparatus that provides the function to the application program that has become a product.

5. The information processing system according to claim 4, wherein
the one or more processors are further configured to
determine the type of the apparatus based on information concerning the apparatus.

6. The information processing system according to claim 1, wherein
the one or more processors are further configured to
determine whether the authentication token is valid based on predetermined information that associates combinations of the type of the authentication token and the type of the apparatus with respective determination results as to whether the authentication token is valid.

7. An information processing method that an information processing system executes, the information processing system including an apparatus configured to carry out a function and an application program configured to provide a service using the function, the information processing method comprising:
receiving a request, transmitted from the application program, to carry out the function;
determining a type of an authentication token included in the request;
determining a type of the apparatus;
determining whether the authentication token is valid based on the type of the authentication token and the type of the apparatus; and
causing the apparatus to carry out the function corresponding to the request if the authentication token is determined as being valid.

8. The information processing method according to claim 7, further comprising:
in response to receiving the request, determining the type of the authentication token included in the request by determining whether the authentication token is an authentication token used by the application program under development to use the function or an authentication token used by the application program that has become a product to use the function.

9. The information processing method according to claim 8, further comprising:
determining the type of the authentication token based on information included in the authentication token.

10. The information processing method according to claim 7, further comprising:
determining the type of the apparatus by determining whether the apparatus is an apparatus that provides the function to the application program under development or an apparatus that provides the function to the application program that has become a product.

11. The information processing method according to claim 10, further comprising:
determining the type of the apparatus based on information concerning the apparatus.

12. The information processing method according to claim 7, further comprising:
determining whether the authentication token is valid based on predetermined information that associates combinations of the type of the authentication token and the type of the apparatus with respective determination results as to whether the authentication token is valid.

13. A non-transitory computer program product to be executed on a computer to perform a method used in an information processing system that includes an apparatus configured to carry out a function and an application program configured to provide a service using the function, the method comprising:
receiving a request, transmitted from the application program, to carry out the function;
determining a type of an authentication token included in the request;
determining a type of the apparatus;
determining whether the authentication token is valid based on the type of the authentication token and the type of the apparatus; and
causing the apparatus to carry out the function corresponding to the request if the authentication token is determined as being valid.

14. The non-transitory computer program product according to claim 13, the method further comprising:
in response to receiving the request, determining the type of the authentication token included in the request by determining whether the authentication token is an authentication token used by the application program under development to use the function or an authentication token used by the application program that has become a product to use the function.

15. The non-transitory computer program product according to claim 14, the method further comprising:
determining the type of the authentication token based on information included in the authentication token.

16. The non-transitory computer program product according to claim 13, the method further comprising:
determining the type of the apparatus by determining whether the apparatus is an apparatus that provides the function to the application program under development or an apparatus that provides the function to the application program that has become a product.

17. The non-transitory computer program product according to claim 16, the method further comprising:
determining the type of the apparatus based on information concerning the apparatus.

18. The non-transitory computer program product according to claim 13, the method further comprising:
determining whether the authentication token is valid based on predetermined information that associates combinations of the type of the authentication token and the type of the apparatus with respective determination results as to whether the authentication token is valid.

* * * * *